(12) United States Patent
Takahashi

(10) Patent No.: US 8,953,904 B2
(45) Date of Patent: Feb. 10, 2015

(54) IMAGE PROCESSING APPARATUS AND METHOD OF OPERATING IMAGE PROCESSING APPARATUS

(71) Applicant: MegaChips Corporation, Osaka-shi (JP)

(72) Inventor: Kazuma Takahashi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 172 days.

(21) Appl. No.: 13/785,183

(22) Filed: Mar. 5, 2013

(65) Prior Publication Data

US 2013/0236118 A1 Sep. 12, 2013

(30) Foreign Application Priority Data

Mar. 7, 2012 (JP) .................. 2012-050226

(51) Int. Cl.
*G06K 9/40* (2006.01)
*G06T 5/00* (2006.01)
(52) U.S. Cl.
CPC .................. *G06T 5/001* (2013.01); *G06T 5/006* (2013.01)
USPC ....................................... 382/275
(58) Field of Classification Search
USPC ........ 382/255, 263, 275, 277; 358/1.18, 3.26; 348/241
See application file for complete search history.

(56) References Cited

U.S. PATENT DOCUMENTS 7,613,357 B2 * 11/2009 Owechko et al. ............. 382/275
2011/0122298 A1 5/2011 Takahashi et al.

FOREIGN PATENT DOCUMENTS

JP 2011-113234 6/2011

* cited by examiner

*Primary Examiner* — Duy M Dang
(74) *Attorney, Agent, or Firm* — Oblon, Spivak, McClelland, Maier & Neustadt, L.L.P.

(57) ABSTRACT

An image processing apparatus includes a relative coordinate acquiring portion for acquiring a corresponding position over the input image to a predetermined pixel in a rectangular region obtained by dividing the output image, a reference region specifying portion for specifying a reference region including a corresponding region over the input image of the rectangular region for a plurality of rectangular regions arranged continuously over the output image respectively, a reading region determining portion for merging each reference region related to each of the rectangular regions, thereby obtaining a merging region, reading control means for reading a pixel value of each pixel included in the merging region in the input image, and correction processing means for executing the distortion correction processing by using a pixel value of a pixel which is read through the reading control means, thereby acquiring a pixel value of the output image.

6 Claims, 20 Drawing Sheets

FIG. 5

| PROCESSING STAGE | PROCESSING CONTENT | RELATED STRUCTURE |
|---|---|---|
| RELATIVE COORDINATE ACQUIRING STAGE ST1 | CORRESPONDING POSITION SPECIFICATION PROCESSING | RELATIVE COORDINATE ACQUIRING PORTION |
| | OFFSET PROCESSING | |
| | RELATIVE COORDINATE CALCULATION PROCESSING | |
| | RELATIVE COORDINATE STORAGE PROCESSING | ASSOCIATIVE MEMORY |
| READING REGION DETERMINING STAGE ST2 | REFERENCE REGION SPECIFICATION PROCESSING | REFERENCE REGION SPECIFYING PORTION |
| | READING REGION DETERMINATION PROCESSING | READING REGION DETERMINING PORTION |
| PIXEL VALUE READING STAGE ST13 | PIXEL VALUE READ PROCESSING | READING REGION SPECIFYING PORTION |
| | | READING POSITION SPECIFYING PORTION |
| | | PIXEL VALUE STORING PORTION |
| | COORDINATE RETRIEVAL PROCESSING | READING POSITION SPECIFYING PORTION |
| | SPECIFIC PIXEL VALUE STORAGE PROCESSING | ASSOCIATIVE MEMORY |
| | | PIXEL VALUE STORING PORTION |
| OUTPUT PIXEL VALUE CALCULATING STAGE ST4 | RELATIVE COORDINATE ACQUIREMENT PROCESSING | RELATIVE COORDINATE ACQUIRING PORTION |
| | PIXEL VALUE CALCULATION PROCESSING | PIXEL VALUE CALCULATING PORTION |

303

| ADDRESS | POSITION INFORMATION ABOUT CORRESPONDING RELATIVE POSITION | |
|---|---|---|
| | x COORDINATE | y COORDINATE |
| 0 | 2 | 1 |
| 1 | 3 | 1 |
| 2 | 3 | 1 |
| 3 | 4 | 1 |
| 4 | 5 | 1 |
| 5 | 6 | 0 |
| 6 | 7 | 0 |
| 7 | 8 | 0 |
| 8 | 1 | 2 |
| ... | ... | ... |
| 63 | 7 | 7 |

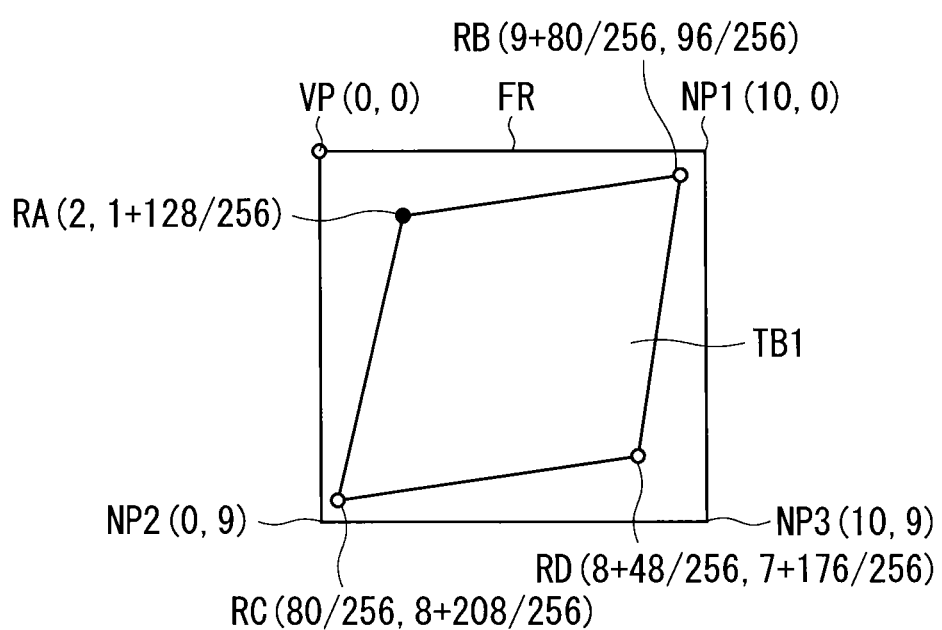
F I G . 1 0

| ADDRESS | POSITION INFORMATION ABOUT CORRESPONDING RELATIVE POSITION | |
|---|---|---|
| | x COORDINATE | y COORDINATE |
| 0 | 2 | 1 |
| 1 | 3 | 1 |
| 2 | 3 | 1 |
| 3 | 4 | 1 |
| 4 | 5 | 1 |
| 5 | 6 | 0 |
| 6 | 7 | 0 |
| 7 | 8 | 0 |
| 8 | 1 | 2 |
| ... | ... | ... |
| 63 | 7 | 7 |

303

F I G. 1 5

| ADDRESS | INPUT PIXEL VALUE |
|---|---|
| 0 | |
| 1 | |
| 2 | |
| 3 | |
| 4 | |
| 5 | PV(6,0), PV(7,0), PV(6,1), PV(7,1) |
| 6 | |
| 7 | |
| 8 | |
| ... | |
| 63 | |

LM

FIG. 17
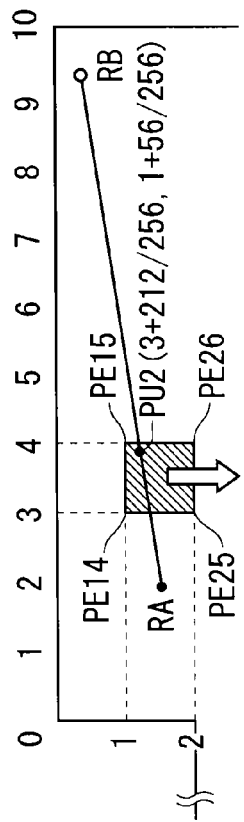
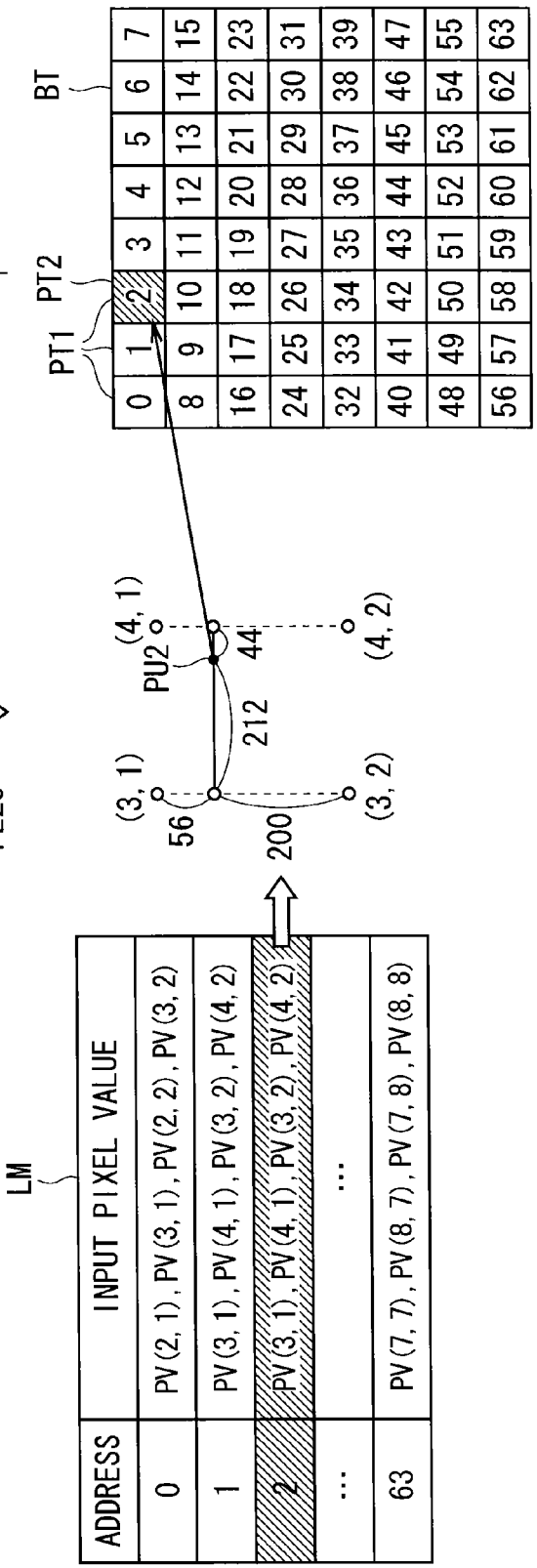

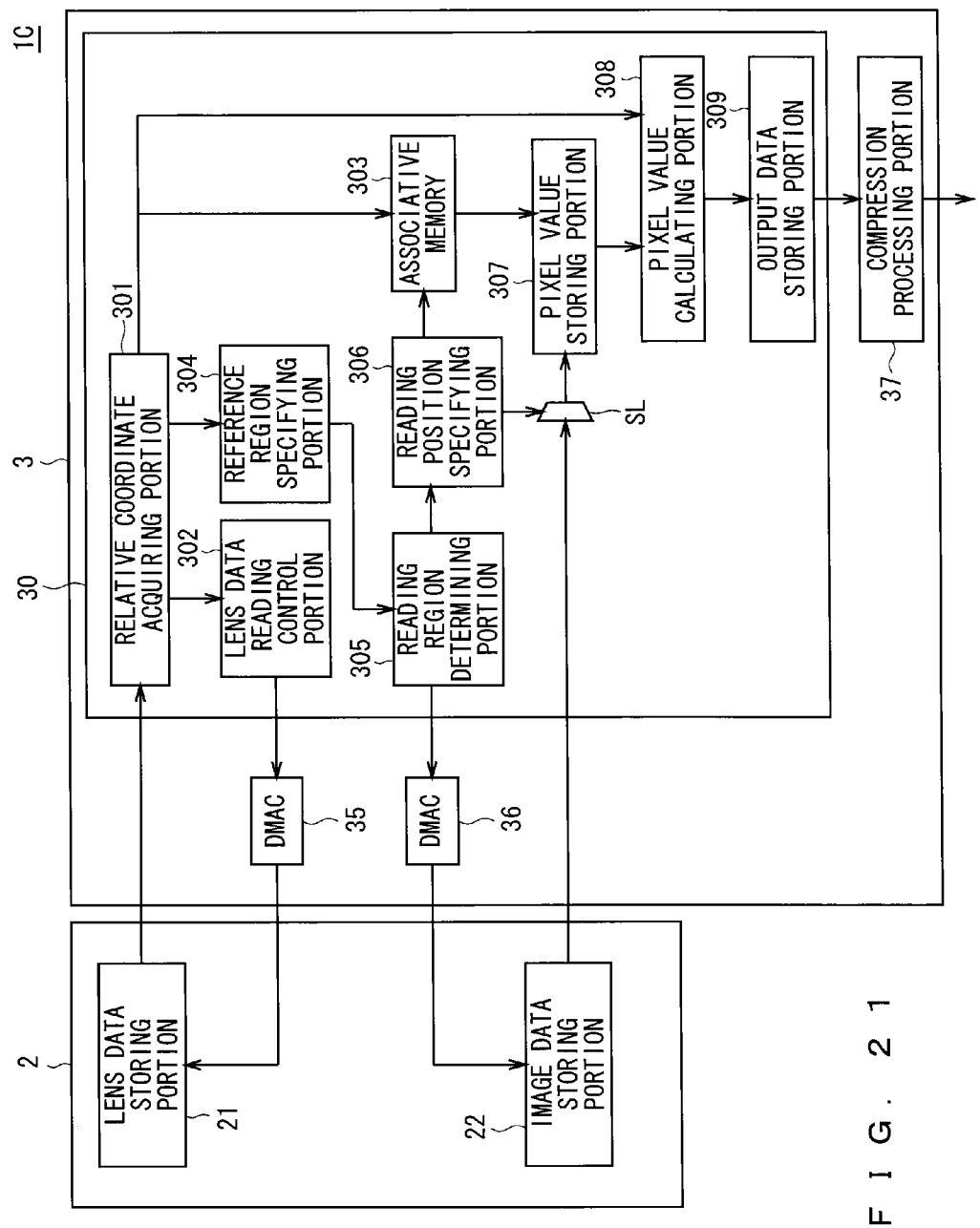
F I G. 21

IMAGE PROCESSING APPARATUS AND METHOD OF OPERATING IMAGE PROCESSING APPARATUS

BACKGROUND OF THE INVENTION

1. Field of the Invention

The present invention relates to an image processing technique.

2. Description of the Background Art

In general, an image pickup lens to be used for an image pickup apparatus or the like has various aberrations such as a spherical aberration and a distortion aberration. For this reason, a lens design suppressing these aberrations is performed when the image pickup lens is to be fabricated.

However, it is hard to remove these aberrations through only the lens design. For this reason, there is proposed a technique for correcting image distortion caused by an aberration of a lens through image processing on data when a subject image can be acquired as image data by means of an image pickup device.

For example, Japanese Patent Application Laid-Open No. 2011-113234 describes the technique for performing distortion correction processing on an input image such as a pickup image obtained through an image pickup lens, thereby acquiring an output image. More specifically, the Japanese Patent Application Laid-Open No. 2011-113234 describes the technique for specifying a corresponding region over an input image to a rectangular region obtained by dividing an output image and reading image data in a reference region surrounding the corresponding region, thereby executing distortion correction processing every rectangular region.

In the case in which the distortion correction processing is executed every rectangular region as in the technique described in the Japanese Patent Application Laid-Open No. 2011-113234, however, an overlapping portion is generated between respective reference regions of the adjacent rectangular regions. For this reason, a transfer quantity of image data is increased.

SUMMARY OF THE INVENTION

It is an object to provide a technique capable of decreasing a transfer quantity of image data.

A first aspect of an image processing apparatus according to the present invention performs distortion correction processing on an input image to output an output image, and includes acquiring means for acquiring a corresponding position over the input image to a predetermined pixel in a rectangular region obtained by dividing the output image, specifying means for specifying a reference region including a corresponding region over the input image of the rectangular region for a plurality of rectangular regions arranged continuously over the output image respectively, merging means for merging each reference region related to each of the rectangular regions, thereby obtaining a merging region, reading control means for reading a pixel value of each pixel included in the merging region in the input image, and correction processing means for acquiring a pixel value of the output image through an interpolation operation using a pixel value of each pixel which is read by the reading control means.

Moreover, a second aspect of the present invention is directed to the image processing apparatus according to the first aspect, wherein the reading control means sequentially reads the pixel value of the pixel in a row direction every row of the pixel.

Furthermore, a third aspect of the present invention is directed to the image processing apparatus according to the first aspect, wherein the specifying means specifies a rectangular region as the reference region, and the merging means performs chamfer processing for cutting a corner of a region on the rectangular reference region and uses a region subjected to the chamfer processing to obtain a merging region.

In addition, a fourth aspect of the present invention is directed to the image processing apparatus according to the third aspect, wherein the merging means virtually defines, over the reference region, a straight line passing through a corresponding position over the input image to a vertex of the rectangular region and having an inclination of a predetermined angle, and excludes, from the reference region, either of two regions obtained by dividing the reference region through the straight line which has a smaller area.

Moreover, a fifth aspect of the present invention is directed to the image processing apparatus according to the first aspect, wherein the correction processing means includes first storing means for storing position information about the corresponding position, deciding means for deciding whether or not a pixel value of a peripheral pixel around the corresponding position which is to be used for calculating a pixel value of the predetermined pixel is read by the reading control means based on the position information, second storing means for storing the pixel value of the peripheral pixel when it is decided that the pixel value of the peripheral pixel is read by the deciding means, and calculating means for calculating the pixel value of the predetermined pixel through an interpolation using the pixel value of the peripheral pixel which is stored in the second storing means.

Furthermore, a method of operating an image processing apparatus according to the present invention performs distortion correction processing on an input image to output an output image, and includes the steps of a) acquiring a corresponding position over the input image to a predetermined pixel in a rectangular region obtained by dividing the output image, b) specifying a reference region including a corresponding region over the input image of the rectangular region for a plurality of rectangular regions arranged continuously over the output image respectively, c) merging each reference region related to each of the rectangular regions, thereby obtaining a merging region, d) reading a pixel value of each pixel included in the merging region in the input image, and e) acquiring a pixel value of the output image through an interpolation operation using a pixel value of each pixel which is read in the step d).

According to the present invention, it is possible to decrease a transfer quantity of image data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a table showing a correspondence relationship between a processing step of the distortion correction processing and a structure of the distortion correcting portion;

FIG. 10 is a chart displaying a reference region in superposition on an input image;

FIG. 15 is a table showing a storage state of a local memory;

FIG. 17 is a diagram showing a state of calculation for an output pixel value;

FIG. 21 is a schematic diagram showing a structure of an image processing apparatus according to a variant.

DESCRIPTION OF THE PREFERRED EMBODIMENTS

A preferred embodiment will be described below with reference to the drawings.

1. Preferred Embodiment

1-1. Summary of Structure

Figure 1:
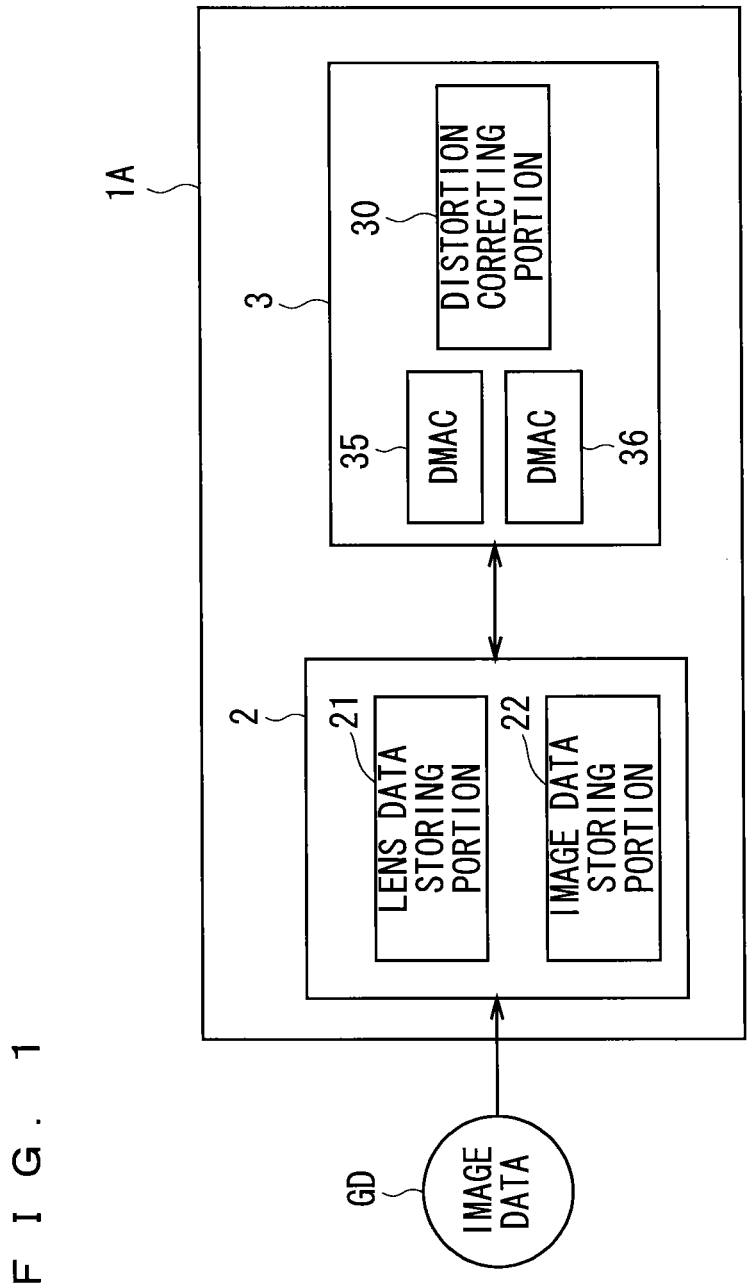
FIG. 1 is a schematic diagram showing a structure of an image processing apparatus according to a preferred embodiment of the present invention.

FIG. 1 is a schematic diagram showing a structure of an image processing apparatus 1A according to a preferred embodiment of the present invention. The image processing apparatus 1A is implemented in a personal computer (PC), a portable information terminal unit or the like, for example.

As shown in FIG. 1, the image processing apparatus 1A includes a first processing circuit 2 and a second processing circuit 3, both of which are constituted as integrated circuits on substrates.

The first processing circuit 2 has a lens data storing portion 21 and an image data storing portion 22. The image data storing portion 22 is an image memory (for example, a DRAM) having a capacity capable of storing a plurality of pieces of image data and serves to store image data GD of an input image which is input to the image processing apparatus 1A. The lens data storing portion 21 stores lens data on a lens of an image pickup apparatus picking up the input image data GD. For example, information about image distortion caused by an aberration of a lens (which is also referred to as "distortion information") is stored as the lens data. The details of the distortion information will be described below.

The second processing circuit 3 is constituted as an image processing circuit and performs various pieces of image processing on the image data GD saved in the image data storing portion 22. In particular, the second processing circuit 3 according to the present preferred embodiment has a distortion correcting portion 30 for performing processing for correcting a distortion of an image (which is also referred to as a "distortion correction processing") on the input image data GD.

Figure 2:
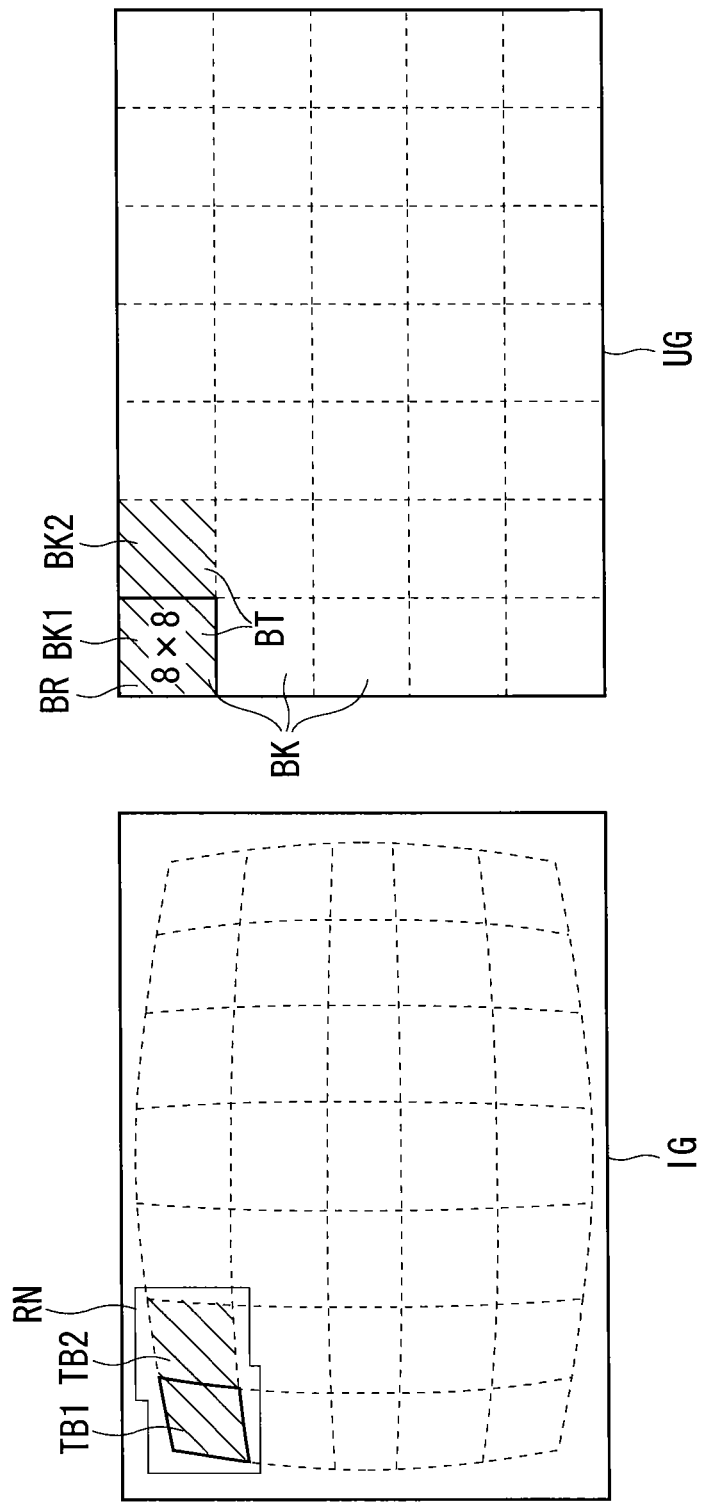
FIG. 2 is a diagram showing a state of distortion correction processing.

The distortion correction processing will be schematically described. FIG. 2 is a diagram showing a state of the distortion correction processing, and illustrates an input image IG having a barrel type distortion aberration and an output image UG subjected to the distortion correction processing. In the input image IG, a distortion of a subject which is caused by a distortion aberration is shown in a broken line.

As shown in FIG. 2, the distortion correction processing is executed by the image processing apparatus 1A by setting a plurality of rectangular regions arranged continuously as a single processing unit in a rectangular region (which is also referred to as a "pixel block" or a "block") BK obtained through a division of the output image UG into a plurality of regions.

For example, there is assumed the case in which two blocks BK1 and BK2 arranged continuously are included in a target region (which is also referred to as an "executing target region") BR to be subjected to the distortion correction processing (a hatching region in FIG. 2). In this case, pixel values of respective pixels in the blocks BK1 and BK2 are calculated by using image data read from a region RN (a reading region which will be described below) including blocks TB1 and TB2 corresponding to the two blocks BK1 and BK2 respectively (which are also referred to as "corresponding regions") in the input image IG.

A size of the block BK may be set automatically by the image processing apparatus 1A or may be designated by a user. In the present preferred embodiment, description will be given by taking, as an example, the case in which the block BK has eight longitudinal pixels and eight horizontal pixels, that is, eight by eight pixels. Moreover, a block included in the executing target region BR will also be referred to as an executing target block BT.

Returning to the description of FIG. 1, the second processing circuit 3 further has DMACs (direct memory access controllers) 35 and 36 for controlling a data transfer between memories. In the image processing apparatus 1A, a data transfer through a bus between the first processing circuit 2 and the second processing circuit 3 is performed in response to control signals sent from the DMACs 35 and 36 in place of a CPU.

1-2. Distortion Correction Processing

Figure 3:
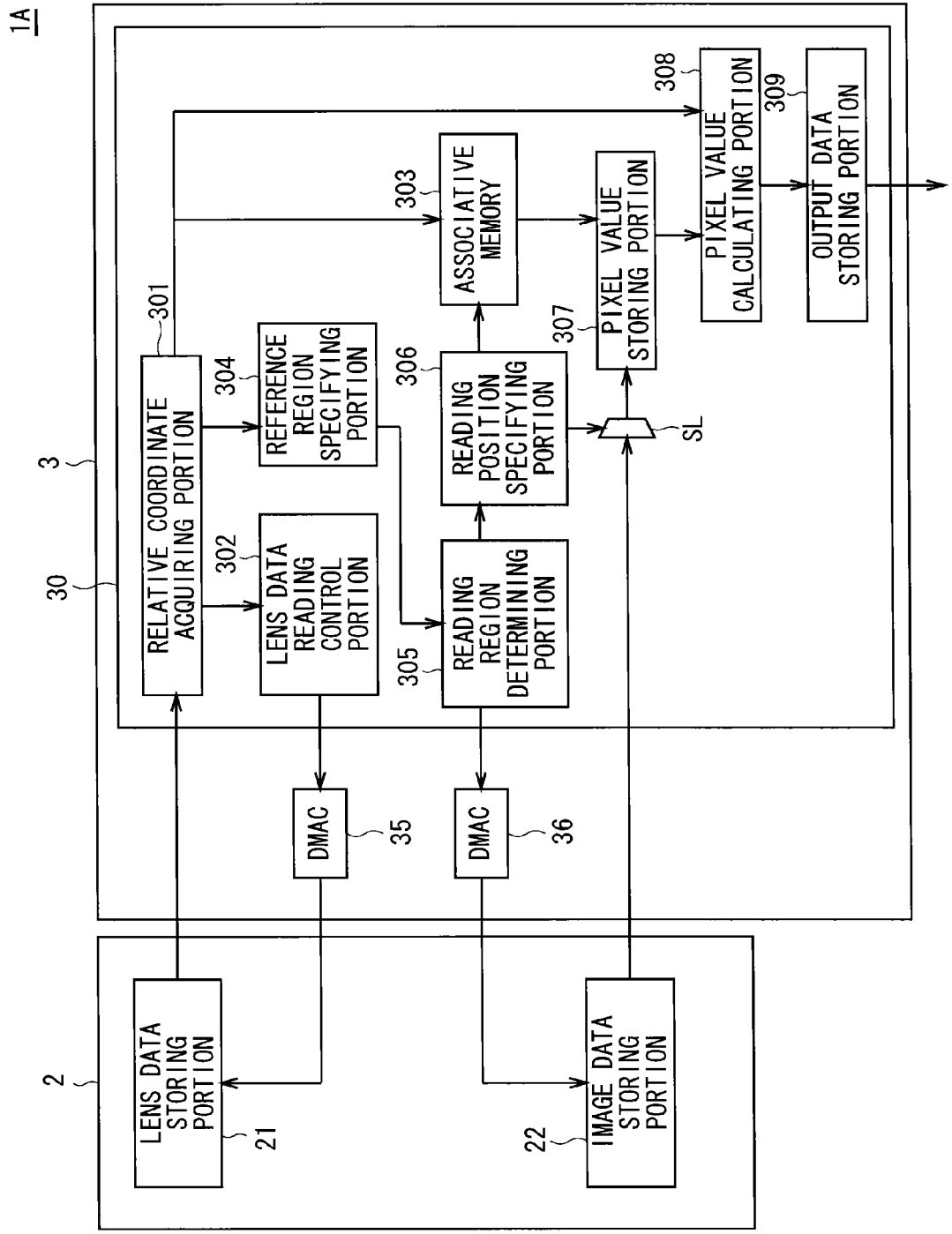
FIG. 3 is a diagram showing a detailed structure of the distortion correcting portion in the image processing apparatus.
Figure 4:
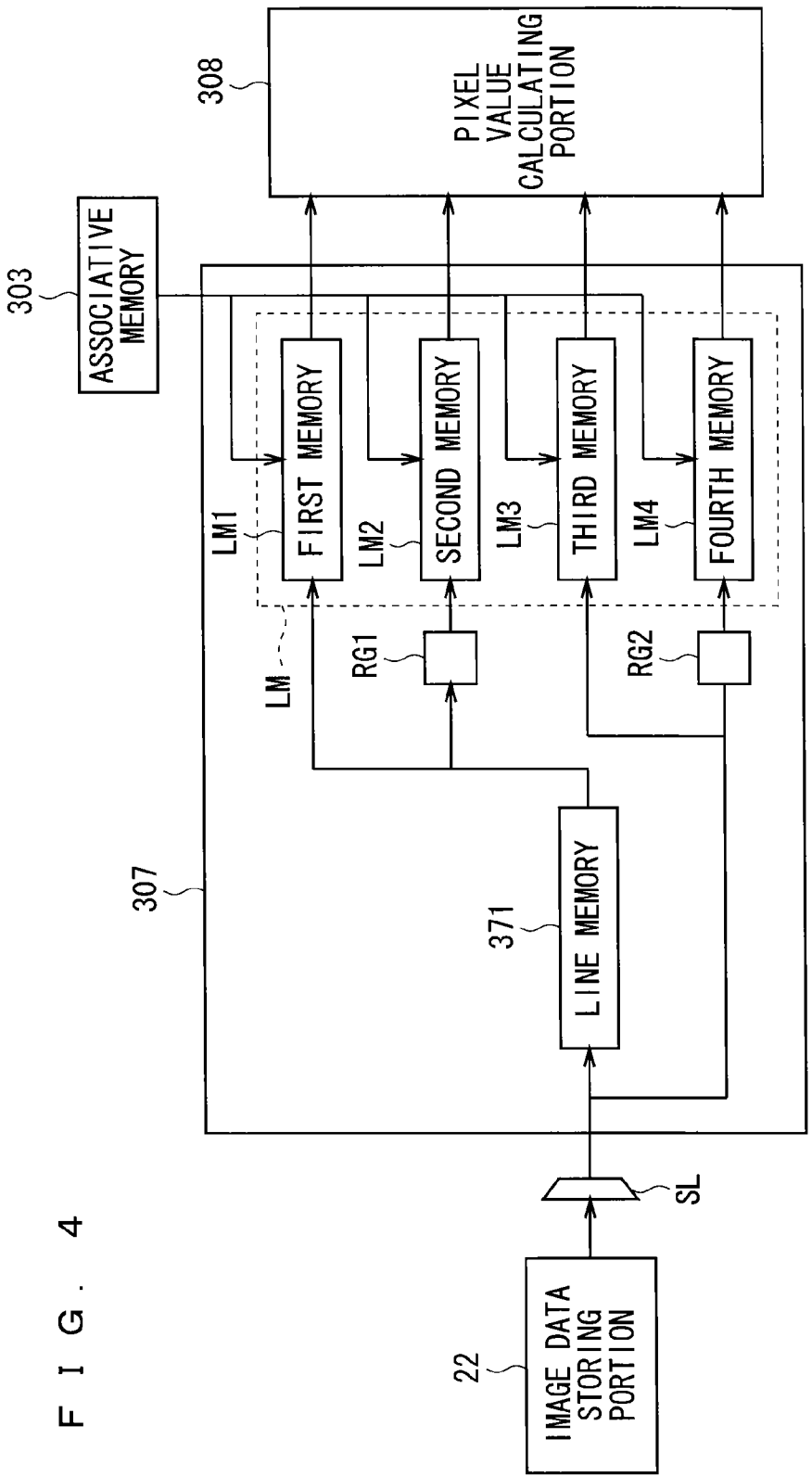
FIG. 4 is a diagram showing a detailed structure of a pixel value storing portion.
Figure 6:
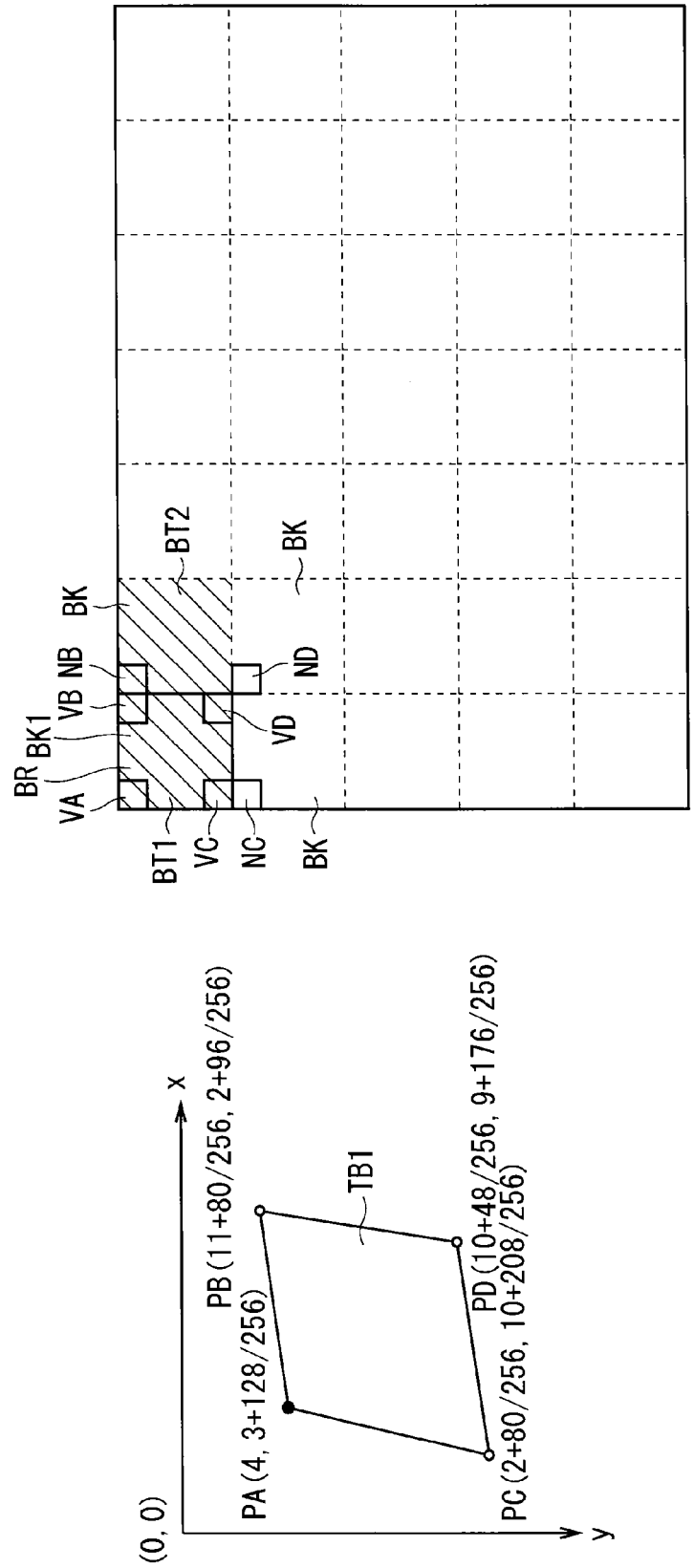
FIG. 6 is a chart showing a relationship between an execution target block and a corresponding block which corresponds to the execution target block in an input image.
Figure 7:
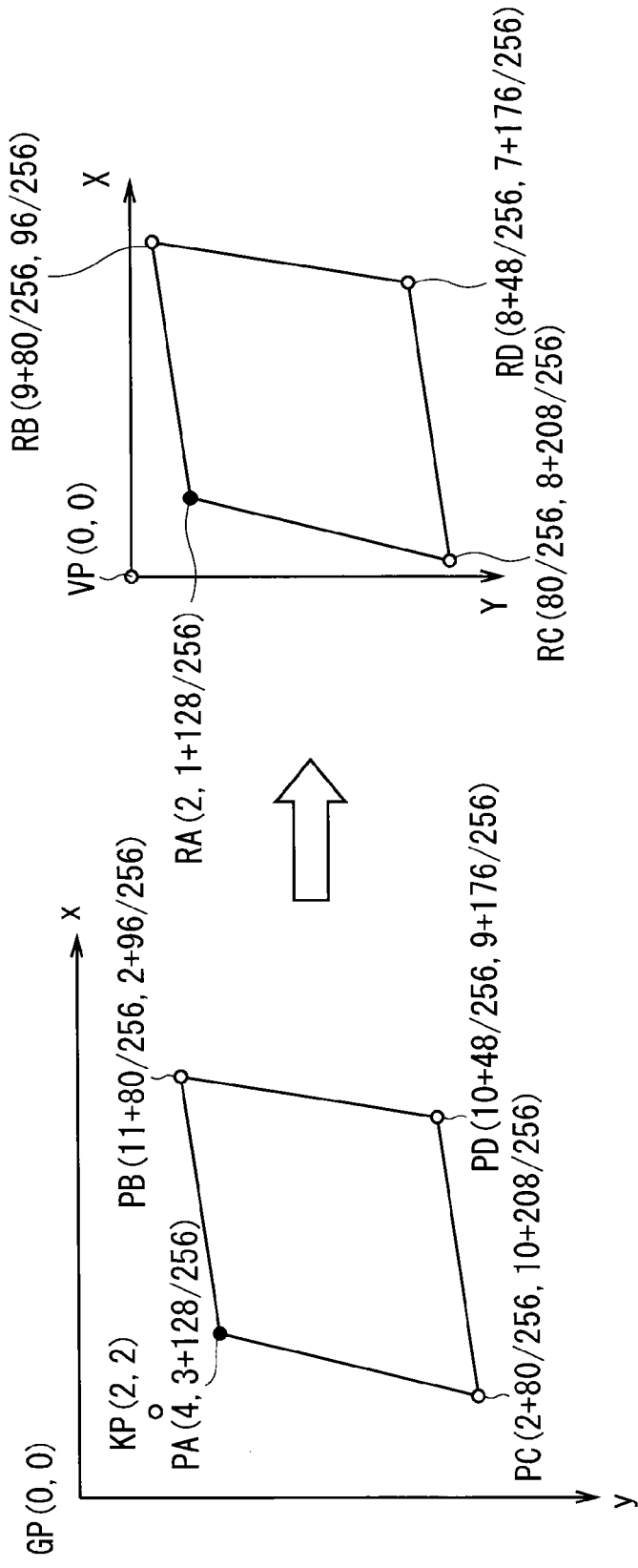
FIG. 7 is a chart for explaining offset processing and reference region specification processing.
Figure 8:
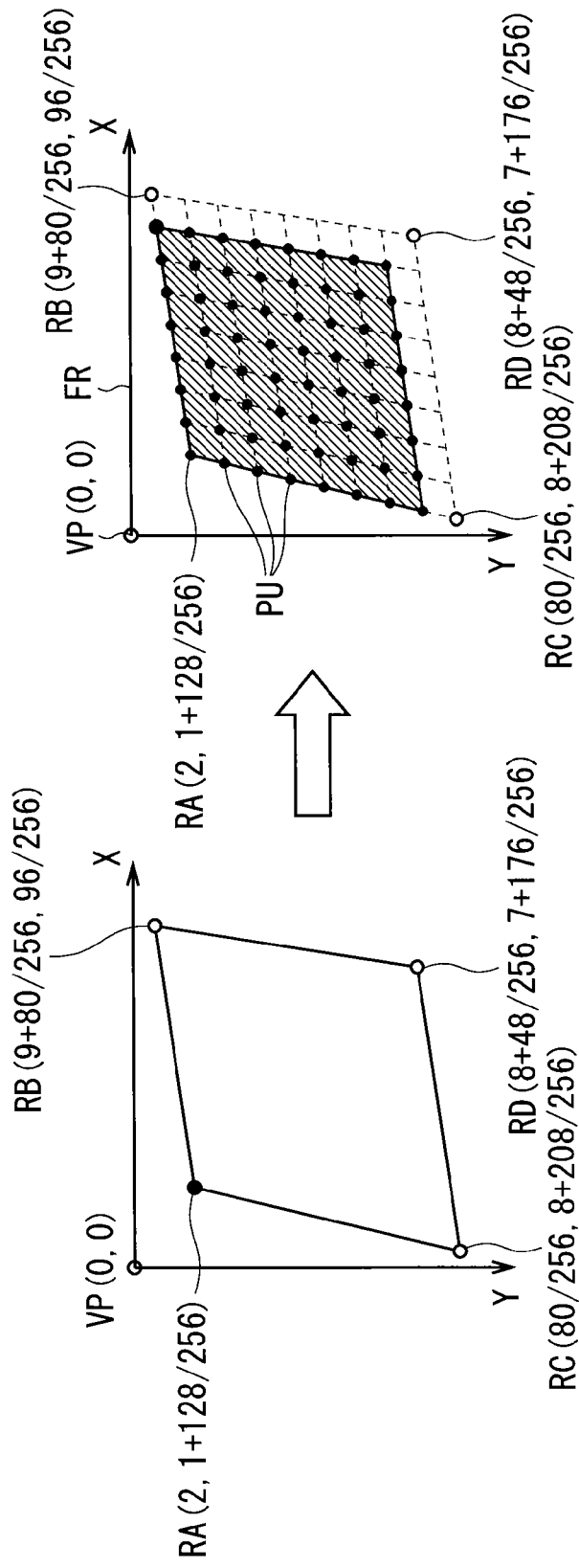
FIG. 8 is a chart for explaining relative coordinate calculation processing.
Figure 9:
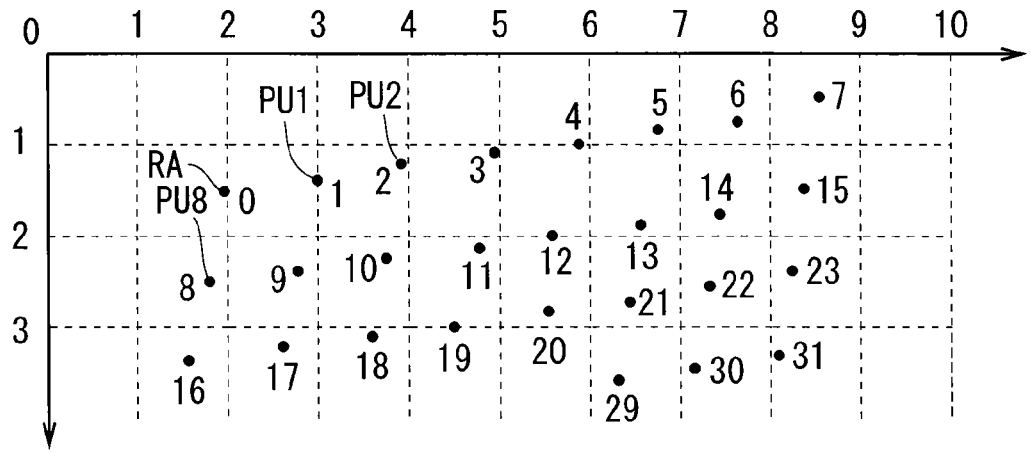
FIG. 9 is a diagram showing a relationship between each corresponding relative position expressed in a relative coordinate system and a storage state of an associative memory.

Description will be given to distortion correction processing for an image which is to be executed by the image processing apparatus 1A. FIG. 3 is a diagram showing a detailed structure of the distortion correcting portion 30 in the image processing apparatus 1A. FIG. 4 is a diagram showing a detailed structure of a pixel value storing portion 307. FIG. 5 is a table showing a correspondence relationship between a processing step of the distortion correction processing and a structure of the distortion correcting portion 30. FIG. 6 is a chart showing a relationship between the block BK1 in the output image UG and the corresponding block TB1 corresponding to the block BK1 in the input image IG. FIG. 7 is a chart for explaining offset processing and reference region specification processing. FIG. 8 is a chart for explaining relative coordinate calculation processing. FIG. 9 is a diagram showing a relationship between each corresponding relative position expressed in a relative coordinate system and a storage state of an associative memory 303.

As shown in FIG. 3, the distortion correcting portion 30 has a relative coordinate acquiring portion 301, a lens data reading control portion 302, the associative memory 303 (CAM: Content Addressable Memory), a reference region specifying portion 304, a reading region determining portion 305, a reading position specifying portion 306, the pixel value storing portion 307, a pixel value calculating portion 308, and an output data storing portion 309.

The relative coordinate acquiring portion 301 has a function for acquiring a corresponding position over the input image IG of each pixel in each executing target block BT included in the executing target region BR of the distortion correction processing.

The lens data reading control portion 302 controls to read data stored in the lens data storing portion 21 through the DMAC 35.

The associative memory 303 has a storing function (first storing means) for storing information and a retrieving function for retrieving information which is coincident with designated information from all pieces of stored information and outputting an address for storing the information which is coincident with the designated information when the coincident information is found.

The reference region specifying portion 304 has a function for specifying a minimum rectangular region including a block corresponding to the executing target block BT as a reference region FR every corresponding block in the input image IG.

The reading region determining portion 305 functions as merging means for merging the reference regions FR of the respective corresponding blocks and serves to determine the reading region RN in the input image IG which is stored in the image data storing portion 22.

Moreover, the reading region determining portion 305 also functions as reading control means for reading image data included in the reading region RN on the input image IG from the image data storing portion 22 through the DMAC 36.

The reading position specifying portion 306 has a function for counting a reading position of a pixel read from the image data storing portion 22 based on information transmitted from the reading region determining portion 305.

As shown in FIG. 4, the pixel value storing portion 307 has a line memory 371 capable of storing pixel values corresponding to predetermined pixels, registers RG1 and RG2 which can temporarily store the pixel values, and a local memory LM constituted by a first memory LM1, a second memory LM2, a third memory LM3 and a fourth memory LM4. The pixel value storing portion 307 with the structure has a function for storing a pixel value of a pixel to be used in a distortion correction from the image data read from the image data storing portion 22.

The pixel value calculating portion 308 performs an interpolation operation using the pixel value of the pixel for the distortion correction which is stored in the pixel value storing portion 307, thereby calculating a pixel value of a pixel in an output image.

The pixel value calculating portion 308, the associative memory 303, the reading position specifying portion 306 and the pixel value storing portion 307 cooperate with each other, and function as correction processing means for acquiring a pixel value of the output image UG based on a pixel value of each pixel read from the reading region RN on the input image IG.

The output data storing portion 309 has a function for temporarily storing a pixel value of a pixel in an output image which is calculated by the pixel value calculating portion 308. The data stored in the output data storing portion 309 are output as image data subjected to the distortion correction to an outside of the distortion correcting portion 30 when a predetermined output model is brought. For example, in the case in which the image data subjected to the distortion correction are output on a block unit of eight pixels by eight pixels, the output data storing portion 309 stores the pixel value of the pixel which is calculated by the pixel value calculating portion 308 until all of the pixel values of the pixels constituting the eight by eight block are collected.

As shown in FIG. 5, the distortion correction processing is executed via four processing stages, that is, a relative coordinate acquiring stage ST1, a reading region determining stage ST2, a pixel value reading stage ST3 and an output pixel value calculating stage ST4 by a cooperation of the respective components 301 to 309 in the distortion correcting portion 30. Description will be given by taking, as an example, the case in which the blocks BK1 and BK2 are included in the executing target region BR of the distortion correction processing as shown in FIG. 2.

In the relative coordinate acquiring stage ST1 to be a first processing stage, corresponding position specification processing, offset processing, relative coordinate calculation processing and relative coordinate storage processing are executed in this order. As shown in FIG. 5, the corresponding position specification processing, the offset processing and the relative coordinate calculation processing are performed by the relative coordinate acquiring portion 301 and the relative coordinate storage processing is performed by the associative memory 303.

More specifically, a corresponding position on the input image IG of one vertex pixel (a reference vertex pixel) of pixels (vertex pixels) positioned on vertices of the executing target blocks BT is specified in the corresponding position specification processing.

In the present preferred embodiment, there is illustrated the case in which a left and upper vertex pixel in the executing target block BT is set to be one of the vertex pixels. In this case, for example, a left and upper vertex pixel VA of the executing target block BT1 included in the executing target region BR is set to be one of the vertex pixels as shown in FIG. 6. Then, a corresponding position PA on the input image IG of the vertex pixel VA is specified.

In the corresponding position specification processing, moreover, corresponding positions on the input image IG of respective pixels (adjacent pixels to a vertex) which are adjacent to respective vertex pixels other than the single vertex pixel are also specified. For example, in FIG. 6, there are specified corresponding positions PB, PC and PD on the input image IG of adjacent pixels NB, NC and ND to the vertex which are adjacent to the other vertex pixels VB, VC and VD of the executing target block BT1. Coordinates of the respective vertices of the corresponding block TB1 on the input image which correspond to the executing target block BT1 are specified by the corresponding position specification processing.

Upon specifying the corresponding positions on the input image IG of the single vertex pixel and the adjacent pixel to the vertex, the distortion information stored in the lens data storing portion 21 is used.

The distortion information is related to corresponding positions on the input image IG of a plurality of main pixels which might be vertex pixels of respective blocks in the output image UG and is prestored in the lens data storing portion 21. The corresponding positions on the input image IG which are stored in the distortion information are given as coordinates in the case in which a left and upper pixel of the input image IG is set to be an origin GP. In the corresponding position specification processing, the distortion information stored in the lens data storing portion 21 is acquired and the corresponding positions on the input image IG of the single vertex pixel and the adjacent pixel to the vertex are specified based on the distortion information, respectively.

The specified corresponding positions are given as absolute coordinates in the case in which the left and upper pixel of the input image IG is set to be the origin GP. For example, as shown in FIG. 6, coordinates of the corresponding positions PA, PB, PC and PD are given as (4, 3+128/256), (11+80/256, 2+96/256), (2+80/256, 10+208/256) and (10+48/256, 9+176/256), respectively.

As shown in FIG. 6, all of the adjacent pixels NB, NC and ND to the vertex are the left and upper vertex pixels of the other blocks BK. For this reason, it is sufficient that information about a corresponding position on the input image IG of a single vertex pixel of each of the blocks BK is recorded as the distortion information.

Moreover, the corresponding position specification processing is executed for each of the executing target blocks BT included in the executing target region BR. In other words, in the case in which two executing target blocks BT1 and BT2 are present in the executing target region BR as shown in FIG. 6, the corresponding position specification processing is executed for each of the two executing target blocks BT1 and BT2.

In the next offset processing, coordinates of four corresponding positions specified by the corresponding position specification processing are converted into relative coordinates from a reference point.

More specifically, a minimum x coordinate and a minimum y coordinate are extracted from coordinates (corresponding position coordinates) of four corresponding positions, and a maximum integer (a first integer) which is equal to or smaller than the minimum x coordinate and a maximum integer (a second integer) which is equal to or smaller than the minimum y coordinate are specified. Then, the first integer is subtracted from the respective x coordinates of the coordinates of the four corresponding positions and the second integer is subtracted from the respective y coordinates of the coordinates of the four corresponding positions to change the coordinates of the respective corresponding positions. The coordinates of the respective corresponding positions thus changed are relative coordinates in the case in which a reference point KP having the first integer as the x coordinate and the second integer as the y coordinate is set to be an origin.

For example, in FIG. 7, the minimum x coordinate in the coordinates of the four corresponding positions is "2+80/256" and the minimum y coordinate is "2+96/256". Therefore, both the first integer and the second integer are "2". The first integer "2" is subtracted from the x coordinate of the corresponding position PA and the second integer "2" is subtracted from the y coordinate of the corresponding position PA so that a relative position (which is also referred to as a "corresponding relative position") RA (2, 1+128/256) is calculated. Referring to the corresponding positions PB, PC and PD, moreover, the same operation using the first integer and the second integer is performed so that relative positions RB, RC and RD are acquired, respectively. The reference point KP (2, 2) is also referred to as a virtual origin VP of a relative coordinate system because it serves as an origin of coordinates for defining a relative position.

In the relative coordinate calculation processing, as shown in FIG. 8, relative coordinates of corresponding relative positions PU on the input image IG of respective pixels (output pixels) constituting the executing target block BT are calculated, respectively. The corresponding relative position PU of each of the output pixels is calculated through an interpolation by using relative coordinates of corresponding relative positions on the input image IG of the single vertex pixel and the adjacent pixel to the vertex. The number of the corresponding relative positions PU to be calculated by the interpolation is varied depending on the size of the executing target block BT, that is, the number of the pixels included in the executing target block BT. In the present preferred embodiment, the corresponding relative positions of the 8 by 8 pixels are calculated. Each corresponding relative position PU is calculated by dividing a distance between the respective corresponding relative positions on the input image IG of the single vertex pixel and the adjacent pixel to the vertex by "eight". The corresponding relative position of the single vertex pixel has already been obtained. For this reason, in the case in which the corresponding relative position PU of the output pixel other than the single vertex pixel is calculated by the relative coordinate calculation processing, there are obtained the corresponding relative positions on the input image IG of all the output pixels constituting the executing target block BT.

By calculating the corresponding relative position PU of the output pixel other than the single vertex pixel through a division by "eight" to be a power of two, it is possible to implement the calculation of the corresponding relative position by a bit shift. Therefore, the operation can be performed more rapidly. In other words, in the present preferred embodiment, it is preferable that the number of the pixels included in the block BK should be set to be the power of two.

In the relative coordinate storage processing, position information about the corresponding relative positions on the input image IG of all the output pixels constituting the executing target block BT are written to the associative memory 303. The writing to the associative memory 303 is performed by designating an address of a save destination every corresponding relative position, and an integer portion of relative coordinates for a single output pixel is stored as position information about the corresponding relative position in an address of one.

For example, in the case in which relative coordinates of each corresponding relative position are expressed in a relative coordinate system shown in FIG. 9, an integer portion (2, 1) of relative coordinates of the left and upper corresponding relative position RA in the respective corresponding relative positions is written to an address of zero in the associative memory 303. Next, an integer portion (3, 1) of relative coordinates of an adjacent corresponding relative position PU1 in the same row is written to the address of one in the associative memory 303. Subsequently, integer portions of relative coordinates in respective corresponding relative positions in the same row are sequentially written to predetermined addresses ("2" to "7") in the associative memory 303. When the writing of the corresponding relative positions in the same row ends, then, a transition to a next row is made to write the corresponding relative positions. In other words, an integer portion (1, 2) of relative coordinates of a corresponding relative position PU8 is written to an address of eight in the associative memory 303, and integer portions of relative coordinates in respective corresponding relative positions in the same row starting from the corresponding relative position PU8 are written to the associative memory 303. The writing to the associative memory 303 proceeds on a row unit and ends when position information about all the corresponding relative positions are written to an address of 63 in the associative memory 303.

Thus, the processing for storing the position information about the corresponding relative position is sequentially performed in a certain row direction by setting the corresponding relative position of the single vertex pixel as a starting point.

An address of a designated save destination of each corresponding relative position can also be regarded as a serial number related to each corresponding relative position. In the present preferred embodiment, moreover, ordering of a pixel or the like in the sequential reading of a pixel (or a position) in a certain row direction from a starting point pixel on an image (or a predetermined region) is also referred to as raster order.

Moreover, the relative coordinate storage processing is executed for each of the executing target blocks BT included in an executing target region BR. In other words, in the case in which two executing target blocks BT1 and BT2 are present in the executing target region BR as shown in FIG. 6, position information about the corresponding relative positions on the input image IG of the respective pixels included in the two executing target blocks BT1 and BT2 are stored in the associative memory 303. The distortion correcting portion 30 has the associative memories 303 in the number which is equal to or larger than the number of the blocks of the executing target block BT, and the relative coordinate storage processing is performed by the associative memory 303 which is varied every executing target block BT. For example, in the case in which the two executing target blocks BT1 and BT2 are present in the executing target region BR, position information about the corresponding relative positions related to the executing target blocks BT1 and BT2 are stored separately in two associative memories 303 every executing target blocks BT1 and BT2.

Figure 11:
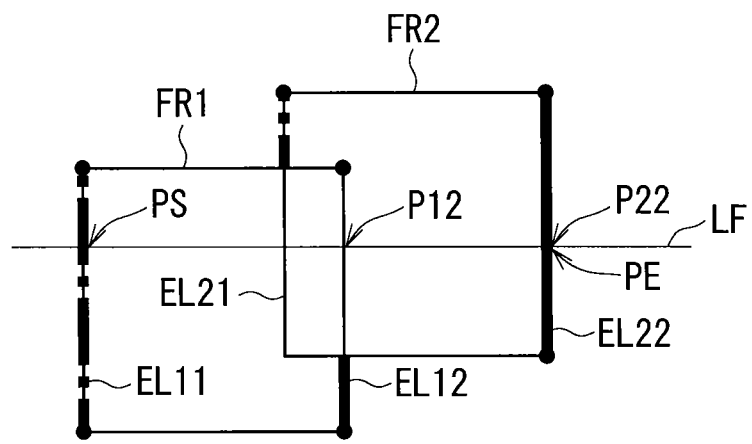
FIG. 11 is a diagram showing two reference regions to be merged.

As shown in FIG. 5, when the relative coordinate acquiring stage ST1 ends, the distortion correction processing makes a transition to the reading region determining stage ST2. In the reading region determining stage ST2, the reference region specification processing and the reading region determination processing are executed. FIG. 10 is a chart displaying a reference region in superposition on an input image. FIG. 11 is a diagram showing two reference regions to be merged.

In the reference region specification processing, a minimum rectangular region including the corresponding block TB is specified as a reference region FR.

As shown in FIG. 10, the reference region FR is set by using the relative coordinates of the vertex of the corresponding block TB1. More specifically, a maximum x coordinate and a maximum y coordinate are extracted from relative coordinates of four vertices, and a minimum integer (a third integer) which is equal to or greater than the maximum x coordinate and a minimum integer (a fourth integer) which is equal to or greater than the maximum y coordinate are specified. For the reference region FR, there is set a rectangular region having, as respective vertices, a point on which the third integer is set to be an x coordinate and the fourth integer is set to be a y coordinate, a point on which the third integer is set to be the x coordinate and "0" is set to be the y coordinate, a point on which "0" is set to be the x coordinate and the fourth integer is set to be the y coordinate, and a virtual origin VP (0, 0).

For example, in FIG. 10, a maximum x coordinate and a maximum y coordinate in the relative coordinates of the four vertices are "9+80/256" and "8+208/256", respectively. Therefore, the third and fourth integers are "10" and "9", respectively. In other words, in FIG. 10, a rectangular region having a point VP (0, 0), a point NP1 (10, 0), a point NP2 (0, 9) and a point NP3 (10, 9) as vertices is set to be the reference region FR.

The reference region specification processing is executed for the corresponding bocks TB of the respective executing target blocks BT included in the executing target region BR. In other words, in the case in which two executing target blocks BT1 and BT2 are present in the executing target region BR as shown in FIG. 6, reference regions are specified for the respective corresponding blocks of the two executing target blocks BT1 and BT2.

In the reading region determination processing, there is performed processing for comparing the coordinates of the vertices of the respective reference regions FR with each other through the same coordinate system, thereby merging the reference regions FR. At the next pixel value reading stage ST3, a merging region obtained by merging the respective reference regions FR is used as the reading region RN upon reading image data from the input image IG. Thus, the merging region is used as a reading region. In the reading region determination processing, therefore, information about a reading start position and information about a reading end position are acquired every row of a pixel included in the merging region.

As a method of merging the reference regions FR, it is possible to employ the following method, for example.

More specifically, first of all, the coordinates of the vertices of each reference region FR are expressed in the same coordinate system, and furthermore, the vertex having a minimum y coordinate and the vertex having a maximum y coordinate are specified.

A reading start position and a reading end position are determined every row from a row to which the vertex having the minimum y coordinate belongs to a row to which the vertex having the maximum y coordinate belongs.

It is possible to determine the reading start position and the reading end position in each row by comparing x coordinates of respective longitudinal sides in the respective reference regions crossing the row with each other every row.

For example, as shown in FIG. 11, there is assumed the case in which two reference regions FR1 and FR2 are merged. In this case, a reading start position of a noted row LF is set to be a position PS indicated by a longitudinal side EL11 having a minimum x coordinate in respective longitudinal sides EL11, EL12, EL21 and EL22 of the reference regions FR1 and FR2 crossing the noted row LF.

When a reading end position of the noted row LF is to be determined, moreover, a position P12 indicated by the longitudinal side EL12 making a pair with the longitudinal side EL11 is set as a reading end candidate position in the reference region FR1 having the longitudinal side EL11 including the reading start position PS.

Then, it is decided whether the reading end candidate position is the reading end position or not based on whether a longitudinal side of an x coordinate which is smaller than the reading end candidate position is present in the reference region FR2 other than the reference region FR1 or not. If the longitudinal side of the x coordinate which is smaller than the reading end candidate position is present, the reading end candidate position is updated. On the other hand, when the longitudinal side of the x coordinate which is smaller than the reading end candidate position is not present, a current reading end candidate position is determine as the reading end position. In FIG. 11, an x coordinate of the longitudinal side EL21 in the reference region FR2 is smaller than the reading end candidate position. For this reason, the reading end candidate position is updated.

Referring to the update of the reading end candidate position, a position P22 indicated by the longitudinal side EL22 making a pair with the longitudinal side EL21 is set as a new reading end candidate position in the reference region FR2 having the longitudinal side EL21 of the x coordinate which is smaller than the current reading end candidate position.

Thereafter, it is decided whether the new reading end candidate position is the reading end position or not based on whether the longitudinal side of the x coordinate which is smaller than the new reading end candidate position is present in other reference regions other than the reference regions FR1 and FR2 or not. In FIG. 11, the other reference regions other than the reference regions FR1 and FR2 are not present. For this reason, there are not the other reference regions having the longitudinal side of the x coordinate which is smaller than the new reading end candidate position. Accordingly, the new reading end candidate position is set as a reading end position PE of the noted row LF.

In the reading region determination processing, thus, the reading start position and the reading end position are specified every row and the reading region RN obtained by merging the reference regions FR is determined. By merging the reference regions FR to set the reading region RN, it is possible to eliminate the overlapping reading of image data in an overlapping portion of the reference regions FR.

Figure 12:
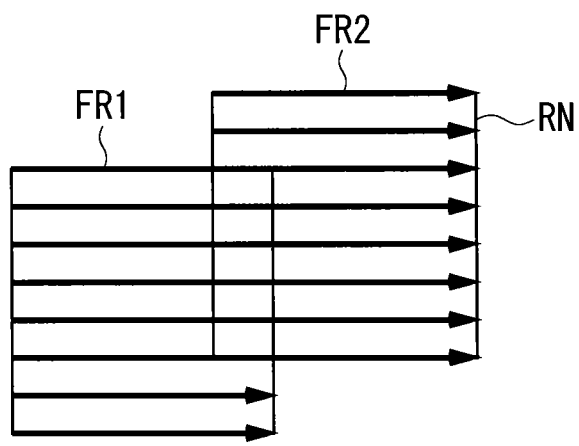
FIG. 12 is a diagram typically showing order for reading a pixel to be read from a reading region.
Figure 13:
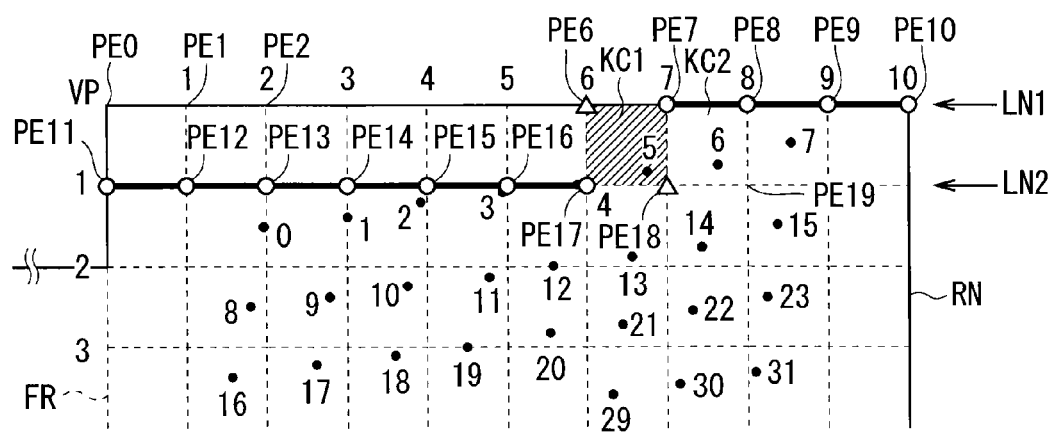
FIG. 13 is a diagram showing a part of the reading region.

As shown in FIG. 5, when the reading region determining stage ST2 ends, the distortion correction processing makes a transition to the pixel value reading stage ST3. In the pixel value reading stage ST3, pixel value reading processing, coordinate retrieval processing and specific pixel value storage processing are executed. FIG. 12 is a diagram typically showing order for reading a pixel to be read from the reading region RN. FIG. 13 is a diagram showing a part of the reading region RN.

More specifically, in the pixel value reading processing, a pixel value of an input pixel included in the reading region RN in the pixels constituting the input image IG is read from the image data storing portion 22. The order for reading the pixel value is raster order shown in FIG. 12. In other words, a pixel value of each input pixel is sequentially read from a reading start portion to a reading end position in each row every row from a row having a minimum y coordinate to a row having a maximum y coordinate in the reading region RN.

The pixel value is read based on a control of the reading region determining portion 305 which also has a function of reading control means. The reading region determining portion 305 generates a reading address based on information about the reading start position and the reading end position for each row which are specified by the reading region determination processing, and outputs the reading address to the DMAC 36. The DMAC 36 reads the pixel value of the input pixel from the image data storing portion 22 based on the reading address.

Then, the pixel value of the input pixel read from the image data storing portion 22 is sequentially input to the pixel value storing portion 307 through a selector SL.

The pixel value storing portion 307 has a function for storing the pixel value of the input pixel read from the reading region RN, and the distortion correcting portion 30 has the pixel value storing portion 307 provided for each reference region FR included in the reading region RN.

The selector SL outputs the pixel value of the input pixel read from the image data storing portion 22 to the pixel value storing portion 307 provided corresponding to each reference region FR in response to a control signal input from the reading position specifying portion 306. Consequently, the pixel value of the input pixel read from the reference region FR1 in the reading region RN is stored in the pixel value storing portion 307 for the reference region FR1, and the pixel value of the input pixel read from the reference region FR2 is stored in the pixel value storing portion 307 for the reference region FR2.

In each pixel value storing portion 307, the pixel value of the pixel input through the selector SL is input to the line memory 371 as shown in FIG. 4.

The line memory 371 has a capacity capable of storing pixel values of pixels corresponding to one row (one line) in the reference region FR, and furthermore, has a function for processing data by a so-called FIFO method. In other words, the line memory 371 outputs a first stored pixel value when a pixel value of a new pixel is input in a state in which the pixel values corresponding to one line in the reference region FR are stored.

A pixel value corresponding to a single pixel which is output from the line memory 371 is directly input to the first memory LM1 in the local memory LM, and furthermore, is input to the second memory LM2 in the local memory LM once through the register RG1 capable of holding the pixel value corresponding to the single pixel.

In the pixel value storing portion 307 having the structure, a pixel value of a pixel which precedes a pixel value of a pixel to be input to the first memory LM1 by one pixel is input to the second memory LM2. In detail, in the case in which a pixel value of a first predetermined pixel output from the line memory 371 is input to the first memory LM1, a pixel value of a pixel output prior to the first predetermined pixel by one pixel (a pixel value of a preceding pixel by one pixel) is input to the second memory LM2.

In the pixel value storing portion 307, moreover, the pixel value of the pixel input from the image data storing portion 22 is directly input to the third memory LM3 in the local memory LM in addition to the line memory 371, and furthermore, is also input to the fourth memory LM4 in the local memory LM through the register RG2 capable of holding a pixel value corresponding to one pixel.

Consequently, a pixel value of a pixel input to the pixel value storing portion 307 prior to a pixel value of a pixel to be input to the third memory LM3 by one pixel is input to the fourth memory LM4. In detail, in the case in which a pixel value of a second predetermined pixel input to the pixel value storing portion 307 is stored in the third memory LM3, a pixel value of a pixel input prior to the second predetermined pixel by one pixel (a pixel value of a preceding pixel by one pixel) is input to the fourth memory LM4.

Detailed description will be given to a state in which a pixel is stored in the pixel value storing portion 307.

For example, when the pixel value reading processing is executed for pixel values of respective pixels included in the reading region RN shown in FIG. 13, an input pixel included in the reference region FR is input to the pixel value storing portion 307 for the reference region FR in raster order from a pixel PE0 positioned on the virtual origin VP. In other words, in the pixel value processing in each reference region FR, when a pixel value is input to the pixel value storing portion 307 in order from the pixel PE0 of a first row LN1 and the input of the pixel value ends till a pixel PE10 of the first row LN1, a pixel value of a pixel in a second row LN2 is sequentially input from a pixel PE11. Subsequently, the pixel value is sequentially read until the pixel values of all the input pixels included in the reading region RN are read.

By the pixel value reading processing, pixel values of pixels corresponding to one line in the reference region FR are stored in the line memory 371. For example, there is assumed the case in which a pixel value of a pixel PE18 in the second row LN2 is read from the image data storing portion 22 and is input to the pixel value storing portion 307.

At this time, pixels corresponding to one line preceding the pixel PE18, that is, respective pixel values related to 11 pixels PE7 to PE18 from a pixel PE7 of the first row LN1 to a pixel PE17 of the second row LN2 are stored in the line memory 371. At this time, moreover, a pixel value of a pixel PE6 in the first row LN1 output from the line memory 371 at a last time is held in the register RG1, and a pixel value of the pixel PE17 in the second row LN2 input to the pixel value storing portion 307 at a last time is held in the register RG2.

When the pixel value of the pixel PE18 is input to the pixel value storing portion 307 as assumed in this state, the pixel value of the pixel PE7 output from the line memory 371 is stored in the first memory LM1. The pixel value of the pixel PE6 held in the register RG1 is stored in the second memory LM2. The pixel value of the pixel PE18 which is input is exactly stored in the third memory LM3. The pixel value of the pixel PE17 held in the register RG2 is stored in the fourth memory LM4.

Referring to a position of each pixel having each pixel value stored in the local memory LM, it is apparent that a pixel value of a pixel (which is also referred to as a "grid pixel") positioned on each grid point of a grid (a spatial grid) to be defined by relative coordinates of an integer set to the reference region FR is stored in the local memory LM. For example, on the assumption that the pixel value of the pixel PE18 in the second row LN2 is input to the pixel value storing portion 307, the pixel values of the pixels PE6, PE7, PE17 and PE18 positioned on respective grid points of a grid KC1 (see a diagonal line hatching region in FIG. 12) are stored in the local memory LM.

Every time a pixel value of a new pixel is input form the image data storing portion 22, the pixel value to be stored in the local memory LM is updated while a position of a grid to be a storing target is changed. For example, with a further progress from the assumption, when a pixel value of a next pixel PE19 (that is, the pixel PE19 which is adjacent to the pixel PE18) is input to the pixel value storing portion 307, the respective pixel values of the pixels PE7, PE8, PE 18 and PE 19 positioned on respective grid points of a grid KC2 are stored in the local memory LM.

Thus, the pixel value storing portion 307 has an organizing function (organizing means) for organizing a set of grid points of grids formed by four adjacent pixels by rearranging the respective pixels which are input. In the pixel value storing portion 307, pixel values of grid pixels organized by the organizing function are temporarily stored in the local memory LM at the same time.

Figure 14:
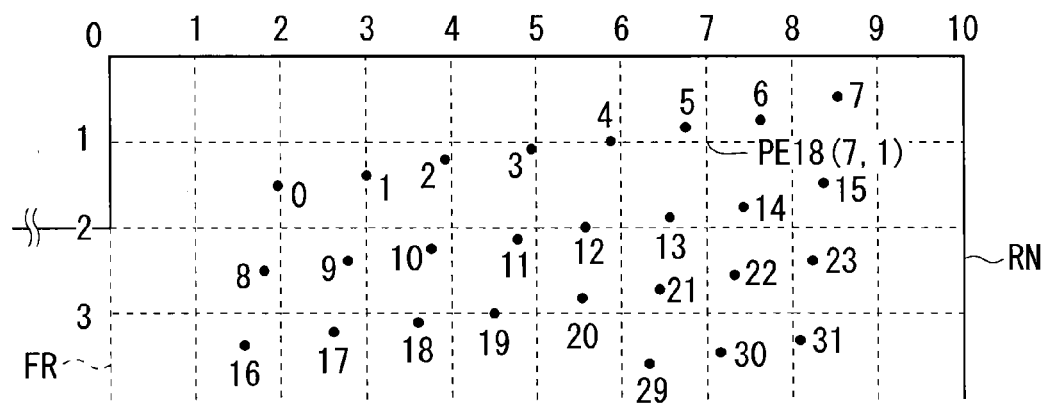
FIG. 14 is a diagram showing a relationship between each corresponding relative position contained in a certain reference region in the reading region and a storage state of the associative memory.

Returning to FIG. 5, referring to the coordinate retrieval processing in the pixel value reading stage ST3, there is performed processing for retrieving position information related to a reading position of a pixel input from the image data storing portion 22 to the pixel value storing portion 307 from the position information about the corresponding relative position stored in the associative memory 303 in cooperation of the associative memory 303 and the reading position specifying portion 306. FIG. 14 is a diagram showing a relationship between each corresponding relative position included in a certain reference region FR in the reading region RN and the storage state of the associative memory 303.

More specifically, when an input pixel included in the reading region RN is started to be read from the image data storing portion 22, a reading position for the read pixel is counted in the reading position specifying portion 306 in response to the control of the reading region determining portion 305. The reading position is counted by updating coordinates indicative of the reading position in the reading region RN in response to the reading of the input pixel.

When the reading position is updated, the reading position thus updated is converted into a relative coordinate system in which reference points KP of the respective reference regions FR are set to be origins. It is possible to perform the coordinate transformation by subtracting the reference points KP of the respective reference regions FR from the coordinates indicative of the reading position.

Moreover, the reading position specifying portion 306 specifies any of the reference regions FR which includes a current reading position based on the coordinates of the reading position subjected to the coordinate transformation.

Thereafter, the reading position specifying portion 306 outputs information about any of the reference regions FR which includes the current reading position (which is also referred to as "belonging region information") to the selector SL and the associative memory 303, and furthermore, coordinates of the reading position subjected to the coordinate transformation are output to the associative memory 303.

There is specified the associative memory 303 which stores position information about a corresponding relative position in a corresponding block included in the reference region FR in the current reading position based on the belonging region information input from the reading position specifying portion 306.

In the specified associative memory 303, subsequently, position information about coordinates having smaller values of x and y coordinates by "1" than the coordinates of the reading position input from the reading position specifying portion 306 are retrieved from the position information about the corresponding relative position which is stored in the associative memory 303. In the case in which smaller position information than the coordinates of the reading position which are input by (1, 1) is found in the position information about the corresponding relative position which is stored in the associative memory 303 through the retrieval, the associative memory 303 outputs, to the pixel value storing portion 307, a signal including an address for storing the position information about the corresponding relative position, that is, a serial number of the corresponding relative position.

For example, as shown in FIG. 14, coordinates (7, 1) of the pixel PE18 in the reference region FR are input from the reading position specifying portion 306 to the associative memory 303 when the pixel value of the pixel PE18 is read from the image data storing portion 22. In the associative memory 303, position information having smaller coordinates (6, 0) than the coordinates (7, 1) of the input reading position by (1, 1) is retrieved from the position information about the corresponding relative position which is stored in the associative memory 303. As shown in FIG. 14, the associative memory 303 stores position information about a corresponding relative position having coordinates (6, 0) in an address of "5". Therefore, the associative memory 303 outputs a serial number of "5" to the pixel value storing portion 307.

Figure 16:
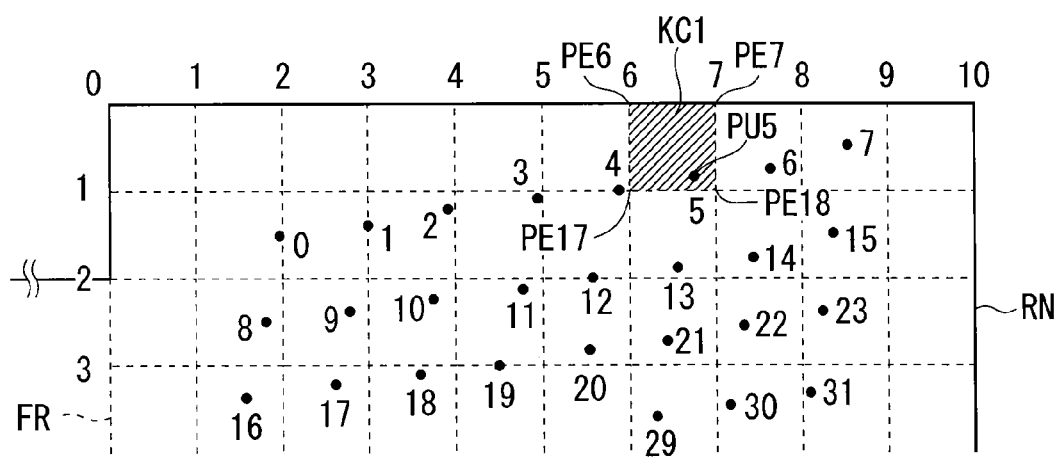
FIG. 16 is a diagram showing a part of the reading region.

The coordinate retrieval processing is performed concurrently with the pixel value reading processing and processing reflecting a processing result of the coordinate retrieval processing and a processing result of the pixel value reading processing is performed in the next specific pixel value storage processing (see FIG. 5). FIG. 15 is a table showing the storage state of the local memory LM. FIG. 16 is a diagram showing a part of the reading region RN.

More specifically, in the specific pixel value storage processing, there is performed processing for storing each pixel value which is stored in the local memory LM in response to a signal input from the associative memory 303. In more detail, in the specific pixel value storage processing, when a signal is input from the associative memory 303, each pixel value stored temporarily in the local memory LM at the time of the input of the signal is stored as a specific pixel value in an address designated by a serial number included in the signal.

For example, on the assumption that the pixel value of the pixel PE18 is read from the image data storing portion 22, the respective pixel values of the pixels PE6, PE7, PE17 and PE18 are temporarily stored in the local memory LM by the pixel value reading processing and the signal including the serial number of "5" is output to the pixel value storing portion 307 by the coordinate retrieval processing. When the specific pixel value storage processing is executed in this state, a pixel value PV (6, 0) of the pixel PE6, a pixel value PV (7, 0) of the pixel PE7, a pixel value PV (6, 1) of the pixel PE17 and a pixel value PV (7, 1) of the pixel PE18 which are temporarily stored in the local memory LM are stored in the address of "5" designated by the serial number of "5" in the local memory LM as shown in FIG. 15. In more detail, the respective pixel values stored temporarily in the first memory LM1, the second memory LM2, the third memory LM3 and the fourth memory LM4 in the local memory LM are stored in the address of "5" in the first memory LM1, the second memory LM2, the third memory LM3 and the fourth memory LM4, respectively.

The respective pixel values stored in the address of "5" of the local memory LM have the pixel values of the pixels PE6, PE7, PE17 and PE18 which are positioned on the respective grid points of the grid KC1 including a corresponding relative position PU5 having the serial number of "5" as described above (see FIG. 16). In other words, in the case in which the pixel value of the pixel PE18 is read from the image data storing portion 22, the pixel values of the grid pixels PE6, PE7, PE17 and PE18 including the corresponding relative position PU5 are stored in the local memory LM.

The processing for storing the pixel value of the grid pixel including the corresponding relative position (which is also referred to as an "including grid pixel") is performed for all the corresponding relative positions in the respective reference regions FR included in the reading region RN. In other words, in the specific pixel value storage processing, pixel values of four including grid pixels related to the respective corresponding relative positions included in the respective reference regions FR are stored as specific pixel values in predetermined addresses of the local memories LM in the pixel value storing portions 307 provided corresponding to the respective reference regions.

In the pixel value reading stage ST3, thus, every time the input pixel included in the reading region RN is read from the image data storing portion 22, it is decided whether the including grid pixel including the corresponding relative position is read or not. If it is decided that the including grid pixel including a certain corresponding relative position is read, a pixel value of the including grid pixel is stored in relation to an identification number (a serial number) of the certain corresponding relative position.

By the retrieving function of the associative memory 303, it is possible to implement the decision as to whether the including grid pixel is read or not. Therefore, the associative memory 303 can also be expressed to function as means for deciding whether the including grid pixel is read or not. Moreover, the including grid pixel is a pixel around a corresponding relative position (which is also referred to as a "peripheral pixel") to be used for calculating a pixel value of an output pixel corresponding to a corresponding relative position through pixel value calculation processing which will be described below.

As shown in FIG. 5, when the pixel value reading stage ST3 ends, the distortion correction processing makes a transition to the output pixel value calculating stage ST4. In the output pixel value calculating stage ST4, the relative coordinate acquirement processing and the pixel value calculation processing are executed. FIG. 17 is a diagram showing a state in which an output pixel value is calculated.

The relative coordinate acquirement processing is executed by the relative coordinate acquiring portion 301 so that relative coordinates of corresponding relative positions on the input image IG of all the output pixels constituting each executing target block BT are acquired. It is possible to acquire the relative coordinates of the corresponding relative position by executing the corresponding position specification processing, the offset processing and the relative coordinate calculation processing again. Alternatively, it is also possible to employ a mode for once storing the relative coordinates of the corresponding relative position which are calculated and using the relative coordinates of the corresponding relative position which are stored in the relative coordinate acquiring stage ST1.

The pixel value calculation processing is executed by the pixel value calculating portion 308 so that a pixel value in a corresponding relative position is calculated by a bilinear interpolation using relative coordinates of the corresponding relative position and a pixel value of an including grid pixel for the corresponding relative position.

For example, as shown in FIG. 17, in the case in which a pixel value in a corresponding relative position PU2 having a serial number of "2" is calculated, a pixel value of an including grid pixel stored in the address of "2" of the local memory LM is read so that the pixel value of the corresponding relative position PU2 is calculated by the bilinear interpolation using the relative coordinates of the corresponding relative position PU2 and pixel values PV (3, 1), PV (4, 1), PV (3, 2) and PV (4, 2) of four including grid pixels PE14, PE15, PE25 and PE26. Then, the pixel value of the corresponding relative position PU2 which is calculated by the pixel value calculation processing is output as a pixel value of an output pixel PT2 which corresponds in the executing target block BT of the output image UG.

The processing for calculating a pixel value in a corresponding relative position is performed for all of the output pixels in the respective executing target blocks BT, and the pixel values of all the output pixels in the respective executing target blocks BT are calculated by the pixel value calculation processing. Then, the pixel value of the output pixel which is output from the pixel value calculating portion 308 is transferred to the output data storing portion 309 and is stored therein.

As described above, the image processing apparatus 1A serves to perform the distortion correction processing on the input image IG, thereby outputting the output image UG, and includes the relative coordinate acquiring portion 301 for acquiring a corresponding position on the input image IG to a predetermined pixel in the rectangular region BK obtained by dividing the output image UG, the reference region specifying portion 304 for specifying the reference region FR including the corresponding region on the input image IG of the rectangular region BK for each of the rectangular regions BK arranged continuously over the output image UG, the reading region determining portion 305 for merging the respective reference regions FR related to the respective rectangular regions BK, thereby obtaining a merging region, reading control means for reading a pixel value of each pixel included in the merging region in the input image IG, and correction processing means for executing the distortion correction processing to acquire a pixel value of the output image UG by using the pixel value of the pixel which is read by the reading control means.

In the image processing apparatus 1A, the respective reference regions FR related to the respective rectangular regions BK arranged continuously over the output image UG are merged and the pixel value of each pixel on the input image IG which is included in the merging region obtained by the merging is read. As compared with the case in which the pixel value of each pixel on the input image IG is read every reference region FR, therefore, it is possible to decrease overlapping read of a pixel. Consequently, it is possible to reduce a transfer quantity of image data, and furthermore, to shorten a time required for reading the image data.

In the image processing apparatus 1A, moreover, the pixel values of the pixels included in the merging region in the input image IG are sequentially read in a row direction every row of a pixel. When data is to be read from the image data storing portion 22, consequently, it is possible to give access in the row direction for a long period of time. Thus, it is possible to enhance a transfer efficiency of a memory. In more detail, by reading image data on a unit of a merging region in which continuously arranged blocks are merged, it is possible to increase a unit of a memory transfer to be performed at a time as compared with the case in which the image data is read every block BK. Consequently, it is possible to enhance a transfer efficiency of data.

2. Variant

Although the preferred embodiment has been described above, the present invention is not restricted to the contents explained above.

Figure 18:
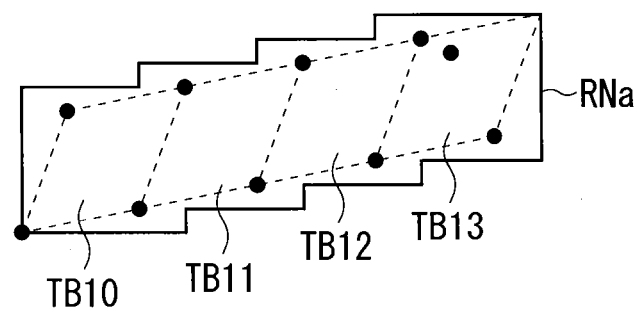
FIG. 18 is a diagram showing a reading region obtained by merging four reference regions.

For example, although the case in which two reference regions FR are merged to determine the reading region RN has been illustrated in the preferred embodiment, the number of the reference regions FR to be merged is not restricted to two but may be three or more. FIG. 18 is a diagram showing a reading region obtained by merging four reference regions.

More specifically, as shown in FIG. 18, a region RNa obtained by merging respective reference regions including four corresponding blocks TB10 to TB13 may be set to be the reading region.

Figure 19:
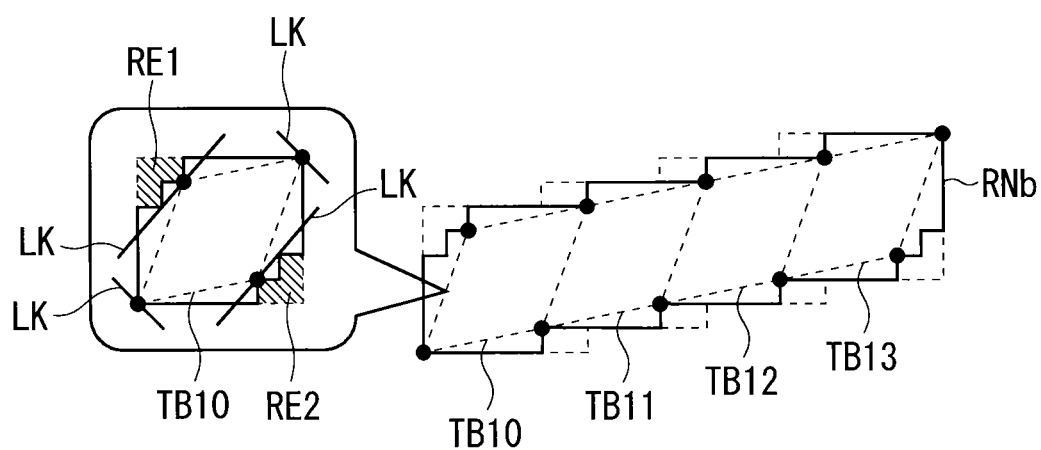
FIG. 19 is a diagram showing an example of a merging region obtained by merging reference regions subjected to processing.

Although the reading region determining portion 305 obtains the merging region by exactly merging the respective reference regions FR, moreover, it is also possible to employ a mode for processing the reference regions FR and merging the reference regions FR subjected to the processing, thereby determining the reading region. FIG. 19 is a diagram showing an example of the merging region obtained by merging the reference regions FR subjected to the processing.

More specifically, as shown in FIG. 19, chamfer processing for cutting a corner of a region may be performed on the reference region FR to set, as the reading region, a merging region obtained by merging the regions subjected to the chamfer processing.

In more detail, the reading region determining portion 305 obtains a straight line (a cutting line) LK passing through a vertex of a corresponding block TB every vertex and having an inclination of a predetermined angle, and specifies exclusion regions RE1 and RE2 (a diagonal line hatching region of FIG. 19) to be cut out through the cutting line LK in the reference region FR. Then, the reading region determining portion 305 sets, as a region subjected to the chamfer processing, a region obtained by omitting the exclusion regions RE1 and RE2 from the reference region FR. The processing is performed on the reference regions FR respectively, thereby obtaining the regions subjected to the chamfer processing which are related to the respective reference regions FR respectively. Thereafter, the regions subjected to the chamfer processing which are related to the respective reference regions FR are merged to determine a reading region RNb.

By performing the chamfer processing on the respective reference regions FR to merge the regions subjected to the chamfer processing, thereby determining the reading region RNb, thus, it is possible to omit, from a reading target, an unnecessary pixel which is not used for calculating a pixel value of an output pixel. Therefore, it is possible to decrease a transfer quantity of image data through reading.

If the reference region FR is divided by the cutting line LK, two regions are obtained. Either of the two regions which has a smaller area is set to be the exclusion region RE1 (RE2). In the case in which a grid region is formed by four pixels which are adjacent to each other in the input image, moreover, each pixel positioned on each grid point in each grid region through which the cutting line LK passes is a pixel which is not removed by the chamfer processing, that is, a pixel which is not included in the exclusion regions RE1 and RE2.

Moreover, it is preferable that an inclination of the cutting line LK to be used for specifying the exclusion regions RE1 and RE2 should be ±45 degrees. A ratio of the numbers of pixels included in an ordinary reading region in the non-execution of the chamfer processing, a reading region in the execution of the chamfer processing using a straight line having the inclination of ±45 degrees, and a corresponding block respectively is 113:101:100. Thus, it is possible to considerably decrease the number of the pixels to be read by the chamfer processing.

Figure 20:
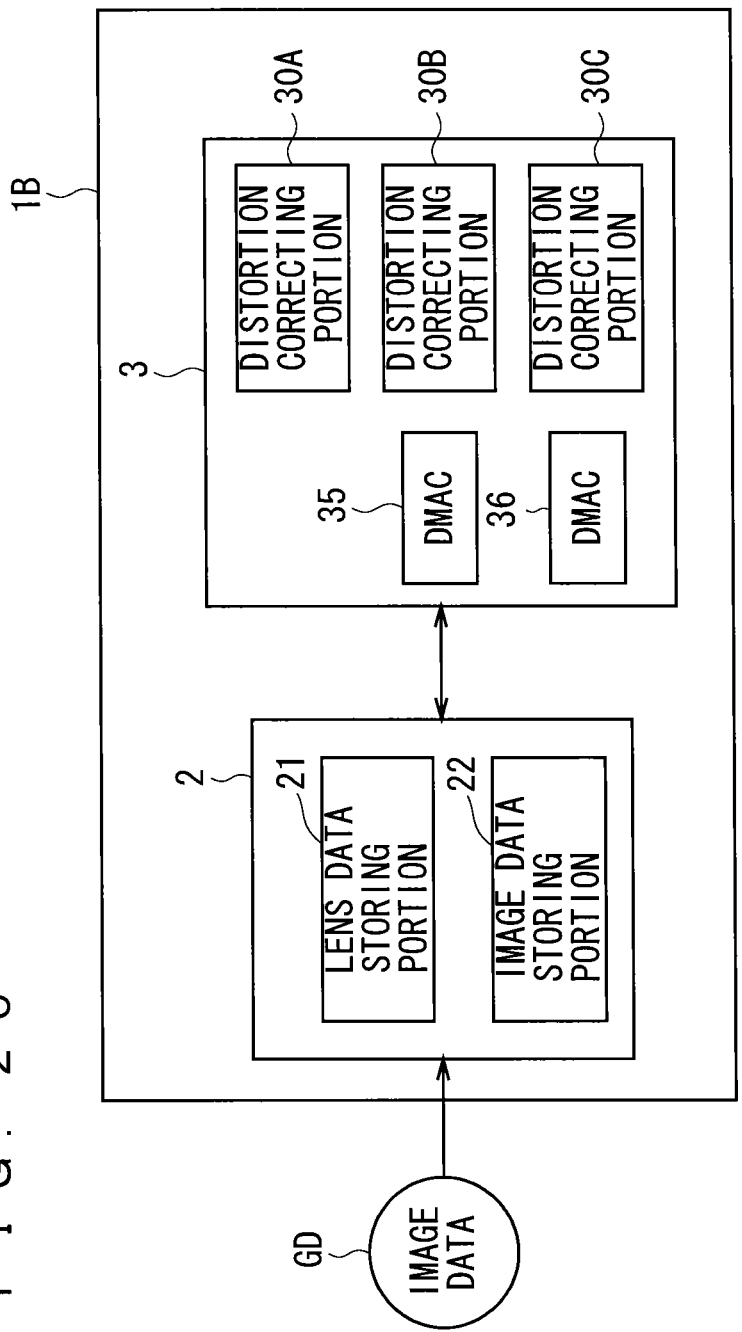
FIG. 20 is a schematic diagram showing a structure of an image processing apparatus according to a variant.

Although there is employed the structure having the single distortion correcting portion 30 in the preferred embodiment, moreover, the present invention is not restricted thereto but it is also possible to employ a structure having a plurality of distortion correcting portions. FIG. 20 is a schematic diagram showing a structure of an image processing apparatus 1B according to a variant.

More specifically, in the image processing apparatus 1B shown in FIG. 20, distortion correcting portions 30A to 30C are provided in a second processing circuit 3. In the image processing apparatus 1B, pieces of distortion correction processing for different executing target regions BR in the same output image UG are performed concurrently with each other in the distortion correcting portions 30A to 30C. By providing the distortion correcting portions 30A to 30C to perform the pieces of distortion correction processing concurrently with each other, thus, it is possible to implement an enhancement in a throughput and an increase in a speed of the distortion correction processing.

In the case in which the pieces of distortion correction processing are executed concurrently with each other, it is also possible to execute the pieces of distortion correction processing in the respective distortion correcting portions 30A to 30C by shifting the processing stages ST1 to ST4 for the distortion correction processing. For example, in the case in which the processing stage of the distortion correction processing to be executed in the distortion correcting portion 30A is the relative coordinate acquiring stage ST1, an execution timing of the distortion correction processing is shifted to reach the pixel value reading stage ST3 in the distortion correcting portion 30B and the output pixel value calculating stage ST4 in the distortion correcting portion 30C. By shifting the execution timing of the distortion correction processing in each of the distortion correcting portions 30A to 30C, thus, it is possible to distribute the utilization of a bus through the distortion correction processing. Therefore, it is possible to enhance a utilization efficiency of the bus.

In the image processing apparatus 1A according to the preferred embodiment, moreover, a compression processing portion 37 may further be provided in a subsequent part of the distortion correcting portion 30. FIG. 21 is a diagram showing a structure of an image processing apparatus 1C according to a variant.

More specifically, the image processing apparatus 1C in FIG. 21 further has a compression processing portion 37 in a second processing circuit 3. The compression processing portion 37 perform compression processing using a JPEG method on image data input from a pixel value calculating portion 308, for example. Processing for compressing an image is performed on a unit of a block by dividing the image into blocks having a predetermined size (for example, eight by eight pixels). Therefore, the compression processing portion 37 is provided in the subsequent part of the distortion correcting portion 30 as a suitable arrangement on a circuit basis.

More specifically, the image data subjected to the distortion correction processing is output on a unit of a block from a distortion correcting portion 30. For this reason, when the compression processing portion 37 is provided in the subsequent part of the distortion correcting portion 30, the image data on the unit of the block is input to the compression processing portion 37. Consequently, the compression processing portion 37 can exactly perform the compression processing on the image data on the unit of the block which are input. By providing the compression processing portion 37 in the subsequent part of the distortion correcting portion 30, thus, it is possible to continuously perform the distortion correction processing and the compression processing without providing a storing portion (for example, a register) for temporally storing the image data. Consequently, it is possible to simplify the circuit structure.

Although there is illustrated the case in which the executing target block BT has the size of 8 by 8 pixels in the preferred embodiment, moreover, the present invention is not restricted thereto but the executing target block BT may have a size of 32 by 32 pixels or 128 by 128 pixels.

Although there is employed the mode in which corresponding positions on the input image IG of the single vertex pixel and the adjacent pixel to the vertex in the executing target block BT are specified based on the distortion information respectively in the preferred embodiment, furthermore, the present invention is not restricted thereto.

More specifically, it is also possible to employ a mode in which corresponding positions on the input image IG of the single vertex pixel and the adjacent pixel to the vertex in regions (a plurality of block regions) formed by setting the executing target blocks BT into a bundle are specified based on the distortion information respectively. The positions of the executing target blocks BT included in the block regions are previously known. By the interpolation operation using the corresponding positions on the input image IG of the single vertex pixel and the adjacent pixel to the vertex in the block regions, therefore, it is possible to specify the single vertex pixel and the adjacent pixel to the vertex in each of the executing target blocks BT included in the block regions.

By calculating the single vertex pixel and the adjacent pixel to the vertex in each of the executing target blocks BT included in the block regions based on the corresponding positions on the input image IG of the single vertex pixel and the adjacent pixel to the vertex in the block regions, thus, it is possible to reduce an information quantity of distortion information to be stored in the lens data storing portion 21. Moreover, it is also possible to decrease a transfer quantity of data from the lens data storing portion 21.

Figure 22:
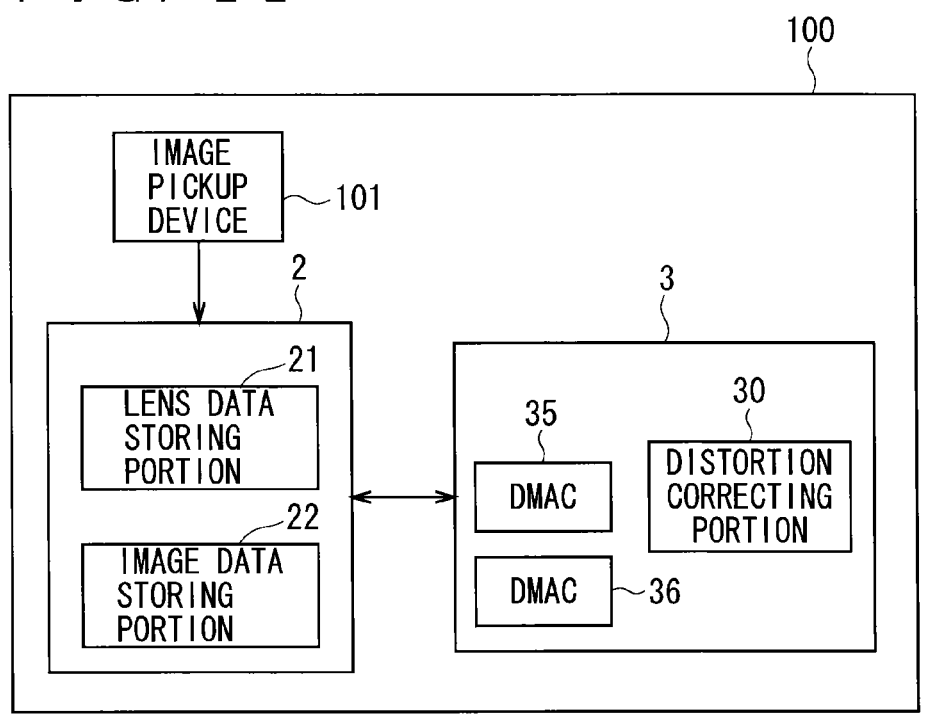
FIG. 22 is a diagram showing an image pickup apparatus according to a variant.

Although the distortion correction processing is implemented in the image processing apparatus 1A in the preferred embodiment, moreover, the present invention is not restricted thereto. FIG. 22 is a diagram showing an image pickup apparatus 100 according to a variant.

As shown in FIG. 22, the image pickup apparatus 100 has an image pickup device 101 such as a COMS sensor or a CCD sensor, and has a function for receiving light forming a subject image (subject light), thereby generating an image signal related to the subject image.

Image data of a photographed image acquired by the image pickup device 101 is stored in an image data storing portion 22 of a first processing circuit 2. In the image pickup apparatus 100, the distortion correction processing is performed on the image data by a distortion correcting portion 30 of a second processing circuit 3.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus for performing distortion correction processing on an input image to output an output image, comprising:
   acquiring means for acquiring a corresponding position over said input image to a predetermined pixel in a rectangular region obtained by dividing said output image;
   specifying means for specifying a reference region including a corresponding region over said input image of said rectangular region for a plurality of rectangular regions arranged continuously over said output image respectively;
   merging means for merging each reference region related to each of said plurality of rectangular regions, thereby obtaining a merging region;
   reading control means for reading a pixel value of each pixel included in said merging region in said input image; and
   correction processing means for acquiring a pixel value of said output image through an interpolation operation using a pixel value of each pixel which is read by said reading control means.

2. The image processing apparatus according to claim 1, wherein said reading control means sequentially reads the pixel value of said pixel in a row direction every row of said pixel.

3. The image processing apparatus according to claim 1, wherein said specifying means specifies a rectangular region as said reference region, and
   said merging means perform chamfer processing for shaving a corner of a region on said rectangular reference region and uses a region subjected to said chamfer processing to obtain a merging region.

4. The image processing apparatus according to claim 3, wherein said merging means virtually defines, over said reference region, a straight line passing through a corresponding position over said input image to a vertex of said rectangular region and having an inclination of a predetermined angle, and excludes, from said reference region, either of two regions obtained by dividing said reference region through said straight line which has a smaller area.

5. The image processing apparatus according to claim 1, wherein said correction processing means includes:
- first storing means for storing position information about said corresponding position;
- deciding means for deciding whether or not a pixel value of a peripheral pixel around said corresponding position which is to be used for calculating a pixel value of said predetermined pixel is read by said reading control means based on said position information;
- second storing means for storing the pixel value of said peripheral pixel when it is decided that the pixel value of said peripheral pixel is read by said deciding means; and
- calculating means for calculating the pixel value of said predetermined pixel through an interpolation using the pixel value of said peripheral pixel which is stored in said second storing means.

6. A method of operating an image processing apparatus which perform distortion correction processing on an input image to output an output image, comprising the steps of:
- a) acquiring a corresponding position over said input image to a predetermined pixel in a rectangular region obtained by dividing said output image;
- b) specifying a reference region including a corresponding region over said input image of said rectangular region for a plurality of rectangular regions arranged continuously over said output image respectively;
- c) merging each reference region related to each of said rectangular regions, thereby obtaining a merging region;
- d) reading a pixel value of each pixel included in said merging region in said input image; and
- e) acquiring a pixel value of said output image through an interpolation operation using a pixel value of each pixel which is read ins said step d).

* * * * *